(12) United States Patent
Vinett

(10) Patent No.: US 10,420,351 B2
(45) Date of Patent: Sep. 24, 2019

(54) GRILL SMOKER APPARATUS

(71) Applicant: Kevin Vinett, Brentwood, TN (US)

(72) Inventor: Kevin Vinett, Brentwood, TN (US)

( * ) Notice: Subject to any disclaimer, the term of this patent is extended or adjusted under 35 U.S.C. 154(b) by 409 days.

(21) Appl. No.: 14/214,920

(22) Filed: Mar. 15, 2014

(65) Prior Publication Data
US 2014/0299005 A1    Oct. 9, 2014

Related U.S. Application Data

(60) Provisional application No. 61/787,800, filed on Mar. 15, 2013.

(51) Int. Cl.
*A23B 4/052*    (2006.01)

(52) U.S. Cl.
CPC ............. *A23B 4/052* (2013.01); *Y02A 40/949* (2018.01)

(58) Field of Classification Search
CPC ... A23B 7/144; A23B 4/052; F23H 2700/006; F23H 2700/007; F23H 17/00
USPC ......... 99/467, 471, 473; 216/15 R, 21 R, 80, 216/312; 126/283
See application file for complete search history.

(56) References Cited

U.S. PATENT DOCUMENTS

| | | | | |
|---|---|---|---|---|
| 103,736 | A | * | 5/1870 | Gregory ...................... 126/25 R |
| 119,169 | A | * | 9/1871 | Ogden .......................... 126/369 |
| 1,038,420 | A | * | 9/1912 | Newcomer et al. .......... 431/341 |
| RE16,011 | E | * | 3/1925 | Simon ..................... A47J 36/20 99/412 |
| 1,919,407 | A | | 7/1933 | Wood |
| D161,577 | S | * | 1/1951 | Ernst .............................. D7/415 |
| 2,611,311 | A | | 9/1952 | Irwin |
| 2,641,085 | A | * | 6/1953 | Robinson et al. .................. 47/2 |
| 2,997,566 | A | | 8/1961 | O'Donnell |

(Continued)

FOREIGN PATENT DOCUMENTS

KR    1020090041085    4/2009

OTHER PUBLICATIONS

Wayfair, Camerons Stainless Steel Li'l Smokey & Reviews, Aug. 28, 2014, four pages, http://www.wayfair.com/Camerons-Stainless-Steel-Lil-Smokey-CLSRet-CMN1002.html.

(Continued)

*Primary Examiner* — Jimmy Chou
(74) *Attorney, Agent, or Firm* — Waller Lansden Dortch & Davis, LLP; Matthew C. Cox

(57) ABSTRACT

A grill smoker apparatus provides a container and a cover. A carrier is disposed in the container. The carrier is configured to store smoke producing material such as wood chips. The carrier may be removable from the container for filling the container, for emptying the container, for replacing the container or for cleaning the smoker apparatus. The carrier includes an outer dimension smaller than the inner dimension of the container. As such, a carrier gap is defined between the inner container wall and the outer region of the carrier. The carrier gap may form a uniform, annular gap in some embodiments. Alternatively, the carrier gap has a non-uniform radial dimension around the perimeter of the container. The carrier gap provides enhanced airflow to the smoke producing material in the carrier for improving smoker performance. A heat concentrator also focuses heat to the smoker apparatus for igniting the smoke producing material.

7 Claims, 18 Drawing Sheets

(56) References Cited

U.S. PATENT DOCUMENTS

| | | | | |
|---|---|---|---|---|
| 3,073,263 A * | 1/1963 | Wynkoop | | A47J 37/079 |
| | | | | 126/163 R |
| 3,307,506 A | 3/1967 | Rose | | |
| 3,413,935 A * | 12/1968 | Behrns | | A47J 37/079 |
| | | | | 126/25 B |
| 3,453,975 A | 7/1969 | Gunter | | |
| 3,586,518 A * | 6/1971 | Folmar | | 9/357 |
| 3,739,732 A | 6/1973 | Graham | | |
| 3,765,397 A * | 10/1973 | Henderson | | 126/25 R |
| 3,838,249 A | 9/1974 | Detterbeck | | |
| 3,903,866 A | 9/1975 | Polinski | | |
| 3,934,520 A | 1/1976 | Brennan | | |
| 4,020,322 A | 4/1977 | Muse | | |
| 4,094,295 A * | 6/1978 | Boswell | | F24B 1/202 |
| | | | | 126/25 R |
| 4,094,649 A * | 6/1978 | Osterried | | C10L 11/00 |
| | | | | 126/25 B |
| 4,227,510 A | 10/1980 | Frazier | | |
| 4,334,462 A * | 6/1982 | Hefling | | 99/385 |
| 4,374,489 A * | 2/1983 | Robbins | | 99/482 |
| 4,401,017 A | 8/1983 | Feld | | |
| D270,987 S * | 10/1983 | Scheufler | | D7/335 |
| 4,413,609 A * | 11/1983 | Tisdale | | 126/25 R |
| 4,417,565 A * | 11/1983 | Karpinia | | 126/25 B |
| 4,481,408 A * | 11/1984 | Scheufler | | 219/432 |
| 4,491,722 A | 1/1985 | Fischer | | |
| 4,495,860 A * | 1/1985 | Hitch et al. | | 99/340 |
| 4,503,835 A | 3/1985 | Williams | | |
| 4,508,094 A * | 4/1985 | Hait | | 126/9 R |
| 4,509,412 A | 4/1985 | Wittenburg | | |
| 4,510,916 A | 4/1985 | Ogden | | |
| 4,512,249 A * | 4/1985 | Mentzel | | 99/352 |
| 4,531,505 A * | 7/1985 | Hait et al. | | 126/9 R |
| 4,531,507 A | 7/1985 | Gerson | | |
| 4,539,973 A * | 9/1985 | Hait | | 126/43 |
| 4,554,864 A * | 11/1985 | Smith et al. | | 99/340 |
| 4,574,776 A | 3/1986 | Hidle | | |
| 4,587,947 A * | 5/1986 | Tomita | | 126/25 R |
| 4,603,679 A | 8/1986 | Ogden | | |
| 4,624,238 A * | 11/1986 | Hait | | 126/9 R |
| 4,626,352 A | 12/1986 | Massey | | |
| 4,638,787 A * | 1/1987 | Tyson | | 126/25 R |
| 4,706,643 A * | 11/1987 | Tyson | | 126/25 R |
| 4,721,037 A * | 1/1988 | Blosnich | | 99/482 |
| 4,762,056 A * | 8/1988 | Virag | | A47J 27/00 |
| | | | | 426/394 |
| 4,779,525 A | 10/1988 | Gaines | | |
| 4,803,921 A * | 2/1989 | Nuss | | 99/483 |
| 4,909,235 A * | 3/1990 | Boetcker | | 126/9 R |
| 4,909,237 A * | 3/1990 | Karpinia | | A47J 37/079 |
| | | | | 126/25 B |
| 4,938,202 A * | 7/1990 | Hait | | 126/9 R |
| 4,962,696 A * | 10/1990 | Gillis | | 99/340 |
| 5,048,406 A | 9/1991 | Cofer | | |
| 5,070,777 A * | 12/1991 | Novak | | A47J 37/0786 |
| | | | | 126/25 R |
| 5,094,223 A * | 3/1992 | Gonzalez | | 126/25 R |
| 5,097,817 A * | 3/1992 | Dodgen | | A47J 37/0704 |
| | | | | 126/25 R |
| 5,154,159 A | 10/1992 | Knafelc | | |
| 5,167,183 A * | 12/1992 | Schlosser et al. | | 99/482 |
| 5,176,124 A * | 1/1993 | Wrasse | | A47J 37/0704 |
| | | | | 126/25 R |
| 5,185,047 A | 2/1993 | Ray | | |
| D333,941 S * | 3/1993 | Hait | | D7/335 |
| 5,195,423 A * | 3/1993 | Beller | | 99/340 |
| 5,197,455 A * | 3/1993 | Tessien | | F23Q 7/02 |
| | | | | 126/144 |
| 5,218,950 A * | 6/1993 | Hait | | F24C 1/16 |
| | | | | 126/25 R |
| 5,253,634 A | 10/1993 | Lebeouf | | |
| 5,269,286 A | 12/1993 | Cowan | | |
| 5,359,988 A * | 11/1994 | Hait | | A47J 37/0704 |
| | | | | 126/153 |
| 5,425,352 A * | 6/1995 | Gillam et al. | | 126/25 R |
| 5,437,222 A | 8/1995 | Franklin | | |
| 5,469,835 A | 11/1995 | Stephen | | |
| 5,473,980 A | 12/1995 | Carpenter | | |
| 5,517,902 A * | 5/1996 | Boston | | A47J 37/0704 |
| | | | | 126/25 R |
| 5,524,610 A | 6/1996 | Clark | | |
| 5,528,984 A * | 6/1996 | Saurwein | | 99/482 |
| D376,510 S | 12/1996 | Ting | | |
| 5,617,778 A | 4/1997 | Schroeter | | |
| D379,900 S * | 6/1997 | Gillam et al. | | D7/337 |
| 5,687,704 A * | 11/1997 | Lerch et al. | | 126/25 R |
| 5,768,983 A | 6/1998 | Treiber | | |
| 5,891,498 A * | 4/1999 | Boehler | | 426/314 |
| 5,957,038 A | 9/1999 | Shimazaki | | |
| 6,019,035 A | 2/2000 | Jonas et al. | | |
| 6,035,770 A * | 3/2000 | Whitefield | | 99/482 |
| 6,055,901 A | 5/2000 | Gantos | | |
| 6,076,515 A | 6/2000 | Smith | | |
| 6,103,291 A * | 8/2000 | Fernandez Tapia | | 426/523 |
| 6,161,534 A * | 12/2000 | Kronman | | A47J 37/07 |
| | | | | 126/25 R |
| 6,167,799 B1 | 1/2001 | Marcias | | |
| 6,176,173 B1 | 1/2001 | Holbrook | | |
| 6,307,193 B1 | 10/2001 | Toole | | |
| 6,314,868 B1 | 11/2001 | Christensen | | |
| 6,314,869 B1 | 11/2001 | Bourgeois, Jr. | | |
| 6,481,344 B1 | 11/2002 | Green et al. | | |
| 6,523,463 B1 | 2/2003 | Hogle | | |
| 6,546,849 B1 | 4/2003 | Shimazaki | | |
| 6,568,314 B1 | 5/2003 | Stepanova | | |
| 6,688,301 B1 * | 2/2004 | McNeill | | A47J 37/0786 |
| | | | | 126/25 B |
| 6,701,829 B2 | 3/2004 | Farrow | | |
| 6,971,305 B1 | 12/2005 | Thomas | | |
| D518,728 S | 4/2006 | Frantz | | |
| 7,021,202 B2 * | 4/2006 | Sizer | | 99/415 |
| 7,101,583 B1 | 9/2006 | Bove | | |
| 7,337,712 B1 * | 3/2008 | Wang et al. | | 99/511 |
| 7,467,718 B1 | 12/2008 | Donohue | | |
| 7,575,002 B2 | 8/2009 | DeMars | | |
| D623,013 S * | 9/2010 | Alden et al. | | D7/409 |
| 7,900,624 B2 * | 3/2011 | DeMars et al. | | 126/25 R |
| D640,896 S | 7/2011 | Molayen | | |
| D642,421 S | 8/2011 | Difante | | |
| 8,067,716 B1 | 11/2011 | Lloyd | | |
| D653,074 S | 1/2012 | Difante | | |
| D658,424 S | 5/2012 | Difante | | |
| D658,425 S | 5/2012 | Difante | | |
| 8,181,640 B2 * | 5/2012 | Park | | 126/376.1 |
| 8,365,717 B1 | 2/2013 | Perry | | |
| D687,257 S | 8/2013 | Difante | | |
| 8,651,018 B1 * | 2/2014 | Loud, III | | 99/482 |
| 8,662,070 B2 | 3/2014 | Johnston | | |
| 8,720,322 B2 * | 5/2014 | West | | 99/340 |
| 8,752,479 B2 | 6/2014 | Sacherman | | |
| 8,826,806 B2 | 9/2014 | Difante | | |
| 9,003,962 B2 | 4/2015 | Broerman | | |
| 9,504,352 B2 | 11/2016 | Lin | | |
| 2002/0166460 A1 | 11/2002 | O'Shea | | |
| 2004/0025862 A1 | 2/2004 | Lor | | |
| 2004/0200359 A1 | 10/2004 | Snider | | |
| 2004/0226454 A1* | 11/2004 | Pirkle et al. | | 99/331 |
| 2005/0098168 A1 | 5/2005 | Williams | | |
| 2006/0005714 A1 | 1/2006 | Siegel | | |
| 2006/0042475 A1* | 3/2006 | Craig | | 99/467 |
| 2008/0078374 A1 | 4/2008 | Polkinghorn et al. | | |
| 2009/0173238 A1* | 7/2009 | Martinez et al. | | 99/352 |
| 2011/0048399 A1 | 3/2011 | Hong | | |
| 2011/0219958 A1* | 9/2011 | Noble | | 99/473 |
| 2012/0107476 A1* | 5/2012 | McLemore et al. | | 426/523 |
| 2012/0174798 A1 | 7/2012 | Kulikowski | | |
| 2012/0225178 A1* | 9/2012 | Degnan | | 426/523 |
| 2012/0240790 A1 | 9/2012 | Difante | | |
| 2013/0011535 A1 | 1/2013 | Mafi | | |

(56) References Cited

U.S. PATENT DOCUMENTS

| | | |
|---|---|---|
| 2013/0074702 A1 | 3/2013 | Difante |
| 2013/0125765 A1 | 5/2013 | Difante |

OTHER PUBLICATIONS

The Green Head, Stainless Steel Grill-Top Smoker tray, Aug. 28, 2014, 5 pages, http://www.thegreenhead.com/2009/07/stainless-steel-grill-top-smoker.php.

Sam's Smoker Pro, Home of Sam's Smoker Pro, Aug. 28, 2014, 2 pages, http://samssmoker.com/smoker-pro/sams-smoker-packages.html.

Sur La Table, Moistly Grilled Smoking Platform, Aug. 28, 2014, 2 pages, http://www.surlatable.com/product/PRO-187633/Moistly-Grilled-Smoking-Platform.

Grilling Companion, Smoking on a Gas Grill, Aug. 28, 2014, 7 pages, http://www.grillingcompanion.com/smoking-on-a-gas-grill.

Patio Daddio BBQ, How to Smoke on a Gas Grill, Aug. 28, 2014, 9 pages, http://www.patiodaddiobbq.com/2011/03/how-to-smoke-on-gas-grill.html.

Bradford Schmidt, Grilltop Smoker Box: Waste of Time or Path to Nirvana, Aug. 28, 2014, 5 pages, http://bradfordschmidt.com/the-meatist/williams-sonoma-smoker-box-review.

You Tube Video, Grilling: Smoking on a Gas Grill, Aug. 28, 2014, 2 pages, https://www.youtube.com/watch?v=uEKnHMpNdzQ.

Walmart, Chef's Basics Select BBQ Grilltop 0.6mm Smoker Box, Aug. 28, 2014, 2 pages, http://www.walmart.com/ip/Chef-s-Basics-Select-BBQ-Grilltop-0.6mm-Smoker-Box/16651442.

Charcoal Companion: TurboQue—Revolutionary Convection Grilling Technology, Aug. 28, 2014, 2 pages, https://www.youtube.com/watch?v=wU-AzQjcjLA.

You Tube Video, How to Set Up a Smoker Box on a Gas Grill, Aug. 28, 2014, 2 pages, https://www.youtube.com/watch?v=droqmzBbBsE.

International Search Report and the Written Opinion, dated Aug. 26, 2014, twelve pages.

European Patent Office Search and Opinion, dated Nov. 23, 2016, 6 pages.

\* cited by examiner

GRILL SMOKER APPARATUS

This nonprovisional utility patent application is a nonprovisional of and claims benefit and priority to U.S. provisional patent application No. 61/787,800 entitled Smoker Apparatus filed Mar. 15, 2014, all of which is hereby incorporated by reference in its entirety.

The present disclosure relates generally to an apparatus for smoking food and more particularly to an apparatus that provides a smoking apparatus for positioning inside a cooking enclosure such as a grill or smoker for smoking food.

Devices for smoking food are generally known in the art. Some food smoking devices include self-contained enclosures in which the food to be smoked is placed. The enclosures can be closed and sealed to contain smoke that imparts flavor to the food, usually with a lid. Inside the enclosure, there is a support structure, such as a grid or platform, on which the meat or other food is placed. Smoke producing material such as charcoal or wood is also placed in the enclosure and ignited. The smoke producing materials are often wood chips soaked in water to facilitate the creation of the smoke, wood pellets designed to burn or smolder when a heat source is applied to the pellets, or liquids that render a flavored smoke when heated. Conventional smokers of this nature are generally large enclosures having a generally cylindrical shape. Most conventional smokers of this nature also rely on burning material for heat and smoke production, as opposed to combustion of flammable gas such as propane.

One problem associated with conventional food-smoking devices is the large, cumbersome hardware associated with a stand-alone smoker. Many consumers own a conventional gas or charcoal-fired grill. Such consumers often do not want to purchase an additional enclosure for smoking food. Additionally, many consumers do not have the additional space for an additional enclosure such as stand-alone smoker on their patios or decks.

Others have attempted to overcome the problems of conventional stand-alone smokers by providing smoke producing devices and materials that may be used with a conventional gas or charcoal-fired grill to smoke food. For example, wood chips may be placed directly over a heat source in a conventional gas or charcoal-fired grill. During use, the wood chips can be ignited and can burn slowly during cooking to produce smoke. However, this conventional method of producing smoke has many drawbacks. It is often difficult to produce a desired amount of smoke, or to control smoke production, using this crude method.

Still others have developed containers for holding smoke producing chips for placing on a grilling surface such as a grid, grate or platform, or directly on gas burners or charcoal. These types of containers include open trays or covered pans that may be vented to permit smoke from the heated smoke producing material to escape. The food is placed on the cooking surface of the grill, and the smoke is contained by closing the cover on the grill, which may or may not allow for the regulation of the amount of smoke within the enclosed cooking area by adjustable vents in the grill cover. These devices also have problems and generally do not produce a desirable amount of smoke for smoking food.

The smoked flavor imparted to the food is dependent upon the nature and amount of smoke to which the food is exposed, as well as the duration of exposure to the smoke during cooking. The more smoke produced by the smoking device, the faster the smoke flavor is imparted to the food. Consequently, more smoke flavor can be imparted to the food in less cooking time when the smoking device produces more smoke under any given cooking conditions. With more smoke, a piece of food that is cooked more rapidly at a higher temperature can be infused with as much smoke flavor as a similar piece of food cooked for a longer period of time at a lower cooking temperature. Also, with more smoke, a piece of food that is cooked to a lesser degree of doneness (e.g., rare) can have the same degree of smoky flavor imparted to it as a similar piece of food cooked at the same temperature for a longer period of time to a greater degree of doneness (e.g., well done).

In conventional smoker devices, the amount of smoke generated by the smoke producing material is dependent upon several factors, including the composition of the smoke producing material, the amount and nature of the heat applied to the smoke producing material, either directly or indirectly, and the air flow around the heated smoke producing material.

Many existing smoking devices that can be used with conventional barbecue grills are placed on top of the open grill, which serves solely as the heat source for the device but does not permit the use of the grill's cooking surface because the device is otherwise a closed system in which the meat is placed within the device along with the source of the smoke. The cooking capacity of those types of devices is, therefore, limited to something less than that of the grill. Because much of the heat generated by the grill is dissipated to the outside of the smoking device, these types of grill-top smokers consume more energy to produce the heat necessary to cook the meat and to cause the smoke producing material to smoke, and their lesser energy efficiency makes them more expensive to operate.

Other smoking devices that are designed to be used with a conventional barbecue grill under a closed cover may allow the end-user to use the grill's cooking surface, but do not optimize the amount of smoke produced by the smoke producing material either because the source of heat used to heat the smoke producing material is diffuse and less efficient at heating the smoke producing material or because the arrangement of the smoke producing material does not optimize the production of smoke by the heated smoke producing material. Still other existing smoking devices used with conventional grills are limited with respect to the smoke producing material that may be used. In many existing devices, the heat is directed to the smoke producing material from only a single direction and/or the air flow about the heated smoke producing material is limited thus limiting the smoke producing materials' exposure to the heat, heating the smoke producing material unevenly or incompletely, and/or limiting the amount of smoke produced by the smoke producing material.

Other conventional smoking devices include external smokers that are attached to the outside of a conventional grill and inject smoke into the grill enclosure. Such conventional devices typically require a modification of the grill enclosure, such as drilling holes into or connecting tubing to the grill for allowing passage of smoke from the external device to the interior of the grill enclosure. This type of installation is burdensome on users of conventional grills. Additionally, many conventional grill users do not like the idea of drilling holes in their expensive grills. Another problem associated with conventional external smoking devices is exposure to the weather. By placing a smoker device on the exterior of a grill, rain, wind and snow can damage and cause corrosion in the smoker. Additionally, insects and animals may form nests in such external smoker devices.

Another problem with conventional smoker devices that are rigidly affixed to a grill is that the smoker device becomes immoveable upon installation. For example, some conventional smoker devices require a user to permanently bolt or attach the smoker to the exterior or interior of a grill. This is an inconvenience for the user in the event the user desires to use the smoker apparatus on a different grill or transport the smoker apparatus independently of the grill to which it is attached.

What is needed, then, are improved smoking devices that operate with a conventional grill, allowing the grill to be used both as a cooking device and a smoker. Also needed are improved smoker devices that are configured to be placed and operated on the interior of a grill enclosure.

BRIEF SUMMARY

One aspect of the present disclosure provides a grill smoker apparatus for smoking food inside the enclosure of a conventional grill. The smoker apparatus includes a heat resistant container having one or more side walls, an open upper end defined by the perimeter of the one or more side walls, and an opening in the lower end. The apparatus also includes a heat resistant carrier having one or more side walls, an open upper end and a bottom, with the one or more side walls and bottom having perforations, and the carrier having dimensions such that the carrier fits within the container.

In some embodiments, the grill smoker apparatus also includes a cover with one or more cover vent holes. The cover fits against the upper end of the container in a close engagement when the carrier is positioned within the container.

In some embodiments, the grill smoker apparatus includes a base at the lower end of the container. The base includes a base vent shaped to allow air to pass through the base into the container. The base vent is located on an inverted base ramp defined in the base extending toward the interior of the container in some embodiments.

A heat concentrator is positioned in the grill enclosure below the base in some embodiments. The heat concentrator includes a lower opening and an upper opening, the lower opening being larger than the upper opening. The heat concentrator forms an inverted funnel shape and provides a local flame or heat jet below the base vent for lighting smoke producing items retained in the carrier.

One object of the present disclosure is to provide a grill smoker apparatus for use inside the enclosure of a grill. The grill smoker apparatus is configured to produce smoke inside the grill to smoke food during cooking or as a standalone smoking device using the grill enclosures.

Another object of the present disclosure is to provide a grill smoker apparatus for use on a side burner of a grill to provide smoke to the interior of the grill enclosure through an opening in the grill enclosure.

A further object of the present disclosure is to provide a grill smoker apparatus having a removable carrier for retaining smoke producing products such as wood chips or pellets.

Another object of the present disclosure is to provide an air gap between the carrier and the container to provide improved air flow to the smoke producing material retained in the carrier.

Yet another object of the present disclosure in some embodiments is to provide a single-use grill smoker apparatus having a container, cover and base with smoke producing material housed in the container. One or more air channels are defined in the container to allow air flow to the smoke producing material. The base includes a base vent, and the cover includes a cover vent to allow air flow through the device. The air channels may be formed via integral longitudinal channels or grooves formed in the container.

Another object of the present disclosure is to provide a grill smoker apparatus having a container with an integral base formed together as a one-piece unit, a base vent in the base, and a cover having a cover vent disposed on the container. A carrier is positioned in the container, and an air gap is defined between the carrier and the container.

A further object of the present disclosure is to provide a grill smoker apparatus having a container and a separate base, wherein the container fits onto the base, the base having a base vent.

Numerous other objects, features and advantages of the present invention will be readily apparent to those of skill in the art, upon a reading of the following disclosure, when taken in conjunction with the accompanying drawings.

DETAILED DESCRIPTION

Figure 1:
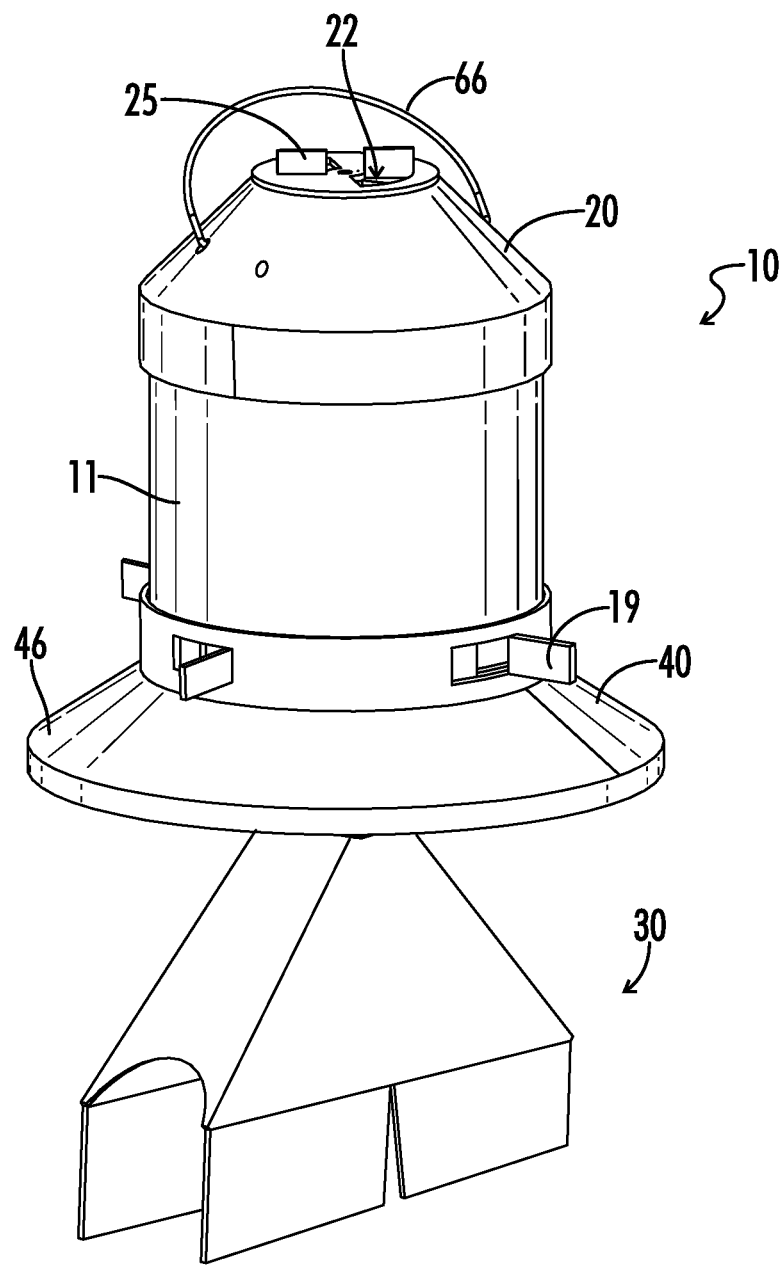
FIG. 1 illustrates a perspective view of an embodiment of a grill smoker apparatus in accordance with the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "is an embodiment" as used herein does not necessarily refer to the same embodiment, although it may. It is understood that in the drawings not all reference numbers are included in each drawing, for the sake of clarity. In addition, positional terms such as "upper," "lower," "side," "top," "bottom," "inner," "outer," "vertical," "horizontal," etc. refer to the apparatus when in the orientation shown in the drawing. The skilled artisan will recognize that objects in accordance with the present disclosure can assume different orientations when in use.

Included herein are multiple illustrations of various embodiments of food smoking devices in accordance the present disclosure. Briefly stated, a grill smoker apparatus in accordance with the various embodiments of the present disclosure provides a user with a way to smoke meat and other foods in a conventional grill enclosure such as on a gas or charcoal grill. The smoker apparatus provides an improvement over conventional devices in some embodiments in that the grill smoker apparatus is configured to be placed inside the grill enclosure during the smoking and/or cooking procedures.

Referring now to the drawings, an embodiment of a smoker apparatus 10 is illustrated in FIG. 1. Alternative embodiments of grill smoker devices are shown in FIGS. 11-20. Smoker apparatus 10 includes a base 40 and a container 11 positioned on base 40. Base 40 is integrated on container 11 as a one-piece unit in some embodiments, such as being formed from a single piece of metal or welded together to form an integral unit. In other embodiments, base 40 is a separate piece from container 11. Container 11 includes a hollow interior configured for containing a smoke producing material such as wood chips, pellets, wood shavings, smoke fuel, or any other suitable smoke producing material known in the art. Base 40 is generally configured to be placed directly onto a grill cooking surface such as a cooking grid or grilling platform 28, seen in FIGS. 2 and 4. In some embodiments, base 40 sits directly on grilling platform 28 inside the grill enclosure during smoking procedures.

Figure 2:
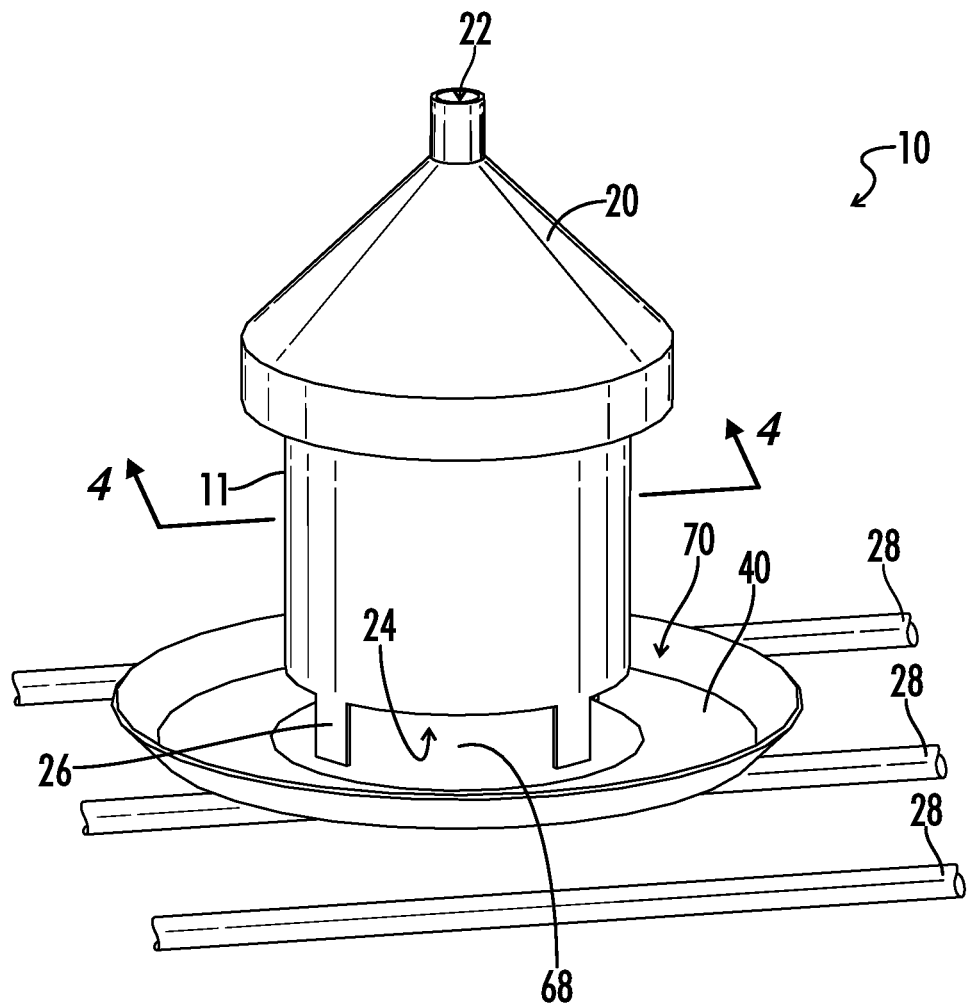
FIG. 2 illustrates a perspective view of an alternative embodiment of a grill smoker apparatus in accordance with the present disclosure.
Figure 3:
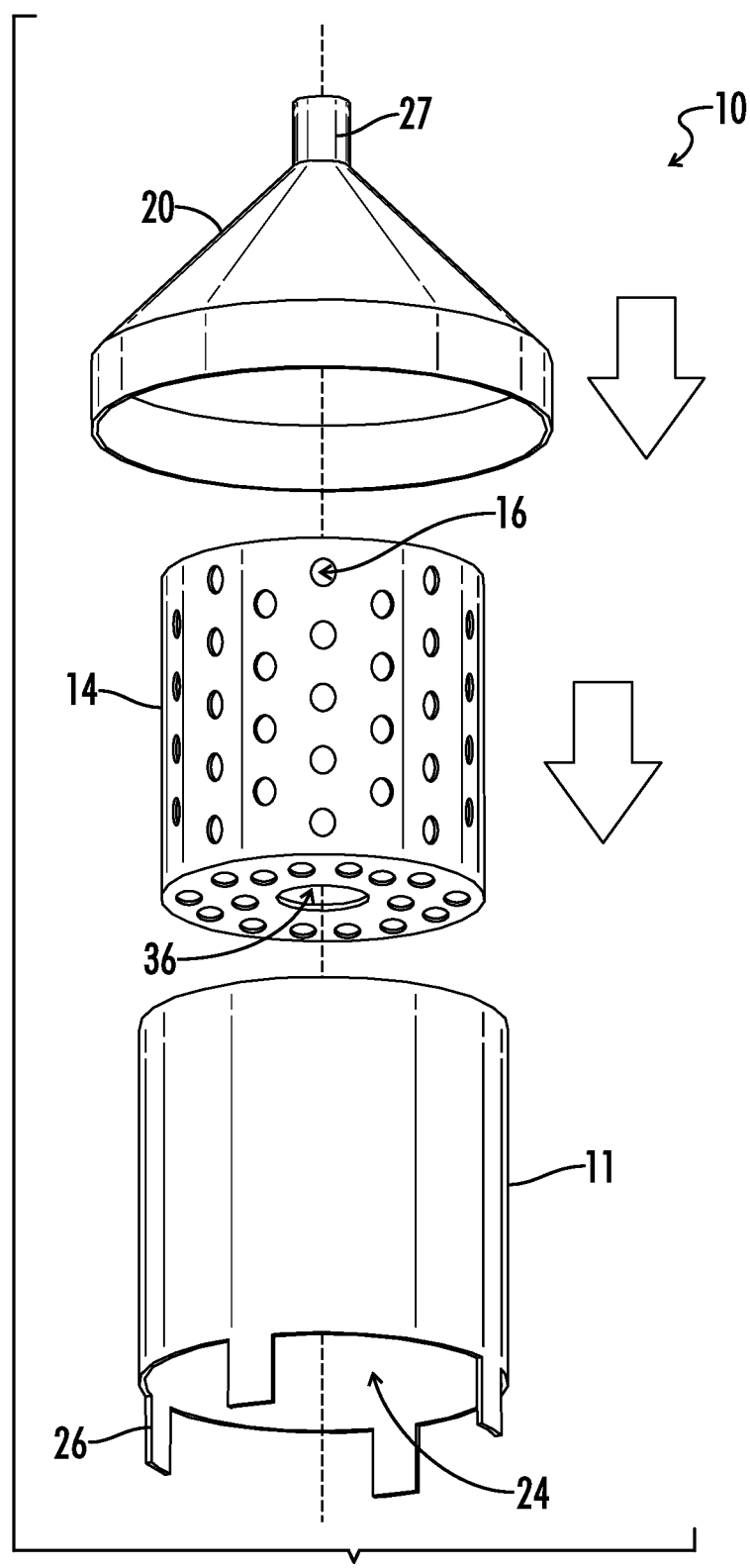
FIG. 3 illustrates an exploded perspective view of an embodiment of a grill smoker apparatus in accordance with the present disclosure.
Figure 4:
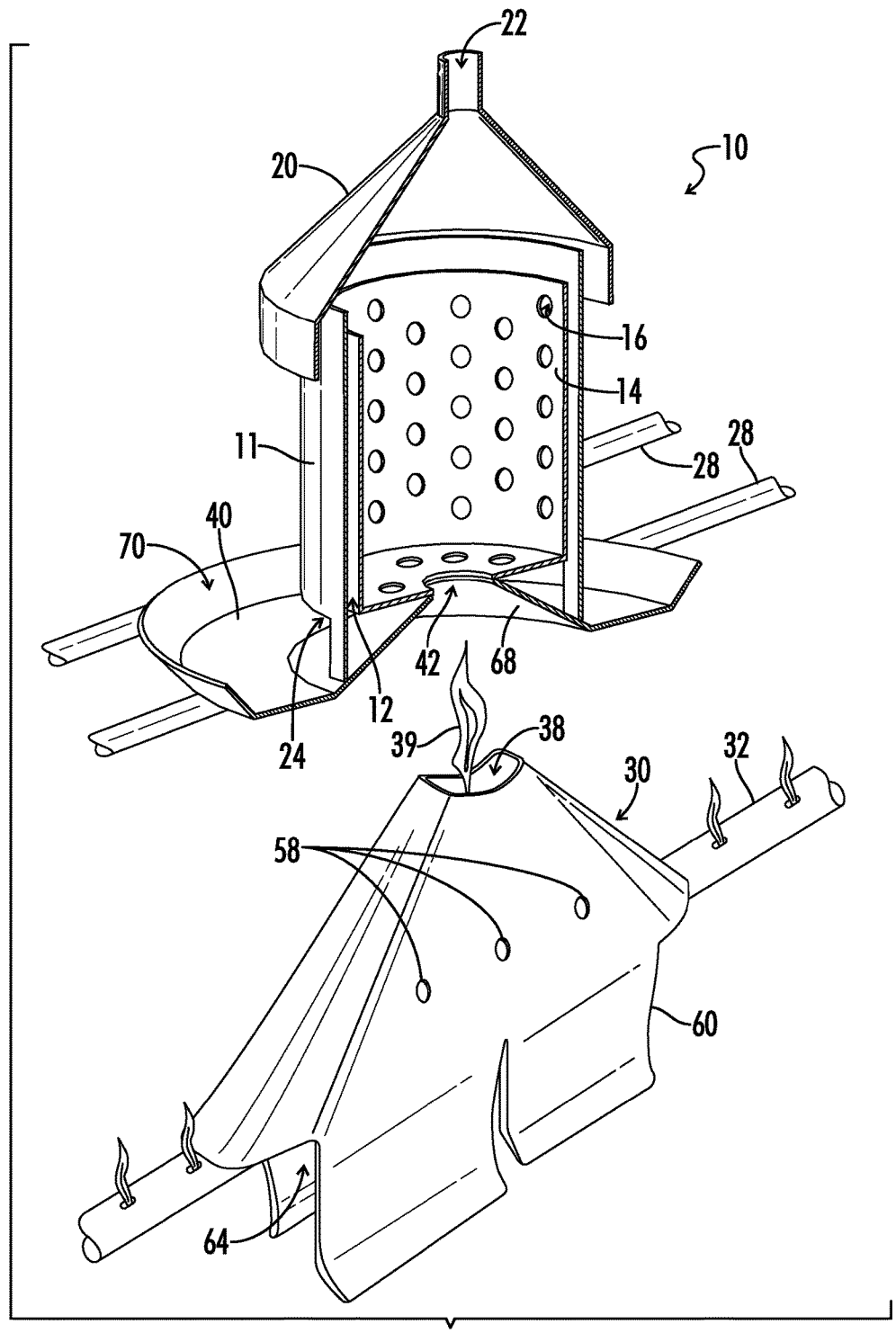
FIG. 4 illustrates a partial cross-sectional view of an embodiment of a grill smoker apparatus in accordance with the present disclosure.

Referring to FIGS. 1-3, 13 and 15-17, smoker apparatus 10 in some embodiments includes a container 11, a fuel carrier 14 that fits within container 11, and a vented cover 20 that fits on the upper end of the container 11. Carrier 14 is generally configured to contain smoke producing materials such as wood chips or wood pellets. Carrier 14 can include any suitable heat-resistant material such as metal, ceramic, porcelain, etc. in various embodiments. Container 11 includes an inner dimension, or inner diameter, such that carrier 14 may be inserted into the interior of container 11, as seen in FIG. 4. Carrier 14 defines an outer carrier dimension, or outer diameter, smaller than the inner diameter of container 11. In some embodiments, carrier 14 includes a wire mesh basket or bowl dimensioned to fit inside container 11. Carrier 14 in alternative embodiments can include a wire mesh screen or any suitable material for housing smoke producing materials.

One aspect of the present disclosure provides enhanced airflow to the smoke producing material housed in carrier 14. Referring further to FIG. 3 and FIG. 4, in some embodiments, carrier 14 includes a plurality of carrier holes 16 defined in the carrier walls and carrier bottom. Carrier holes 16 allow air to enter into carrier 14 not only from below but also from the sides to promote burning or heating of the smoke producing materials housed in carrier 14. Smoke producing materials stored in carrier 14 may produce smoke in relation to the amount of air available for combustion of the material. By allowing more air to enter into the carrier 14, more smoke may be produced. Thus, carrier holes 16 operate to improve the capacity of smoker apparatus 10 to produce a sufficient amount of smoke.

Figure 14:
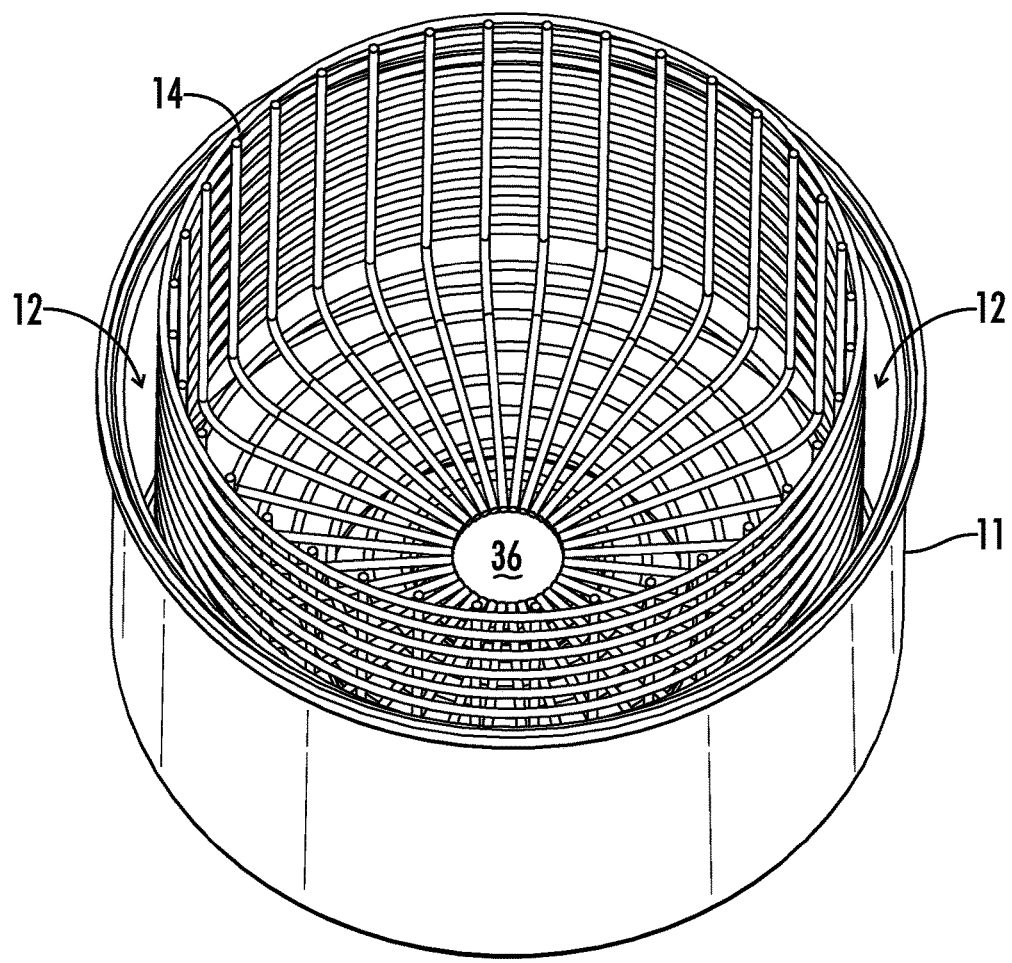
FIG. 14 illustrates a top perspective view of an embodiment of a grill smoker apparatus including a container with carrier viewed from above with the cover removed.
Figure 15:
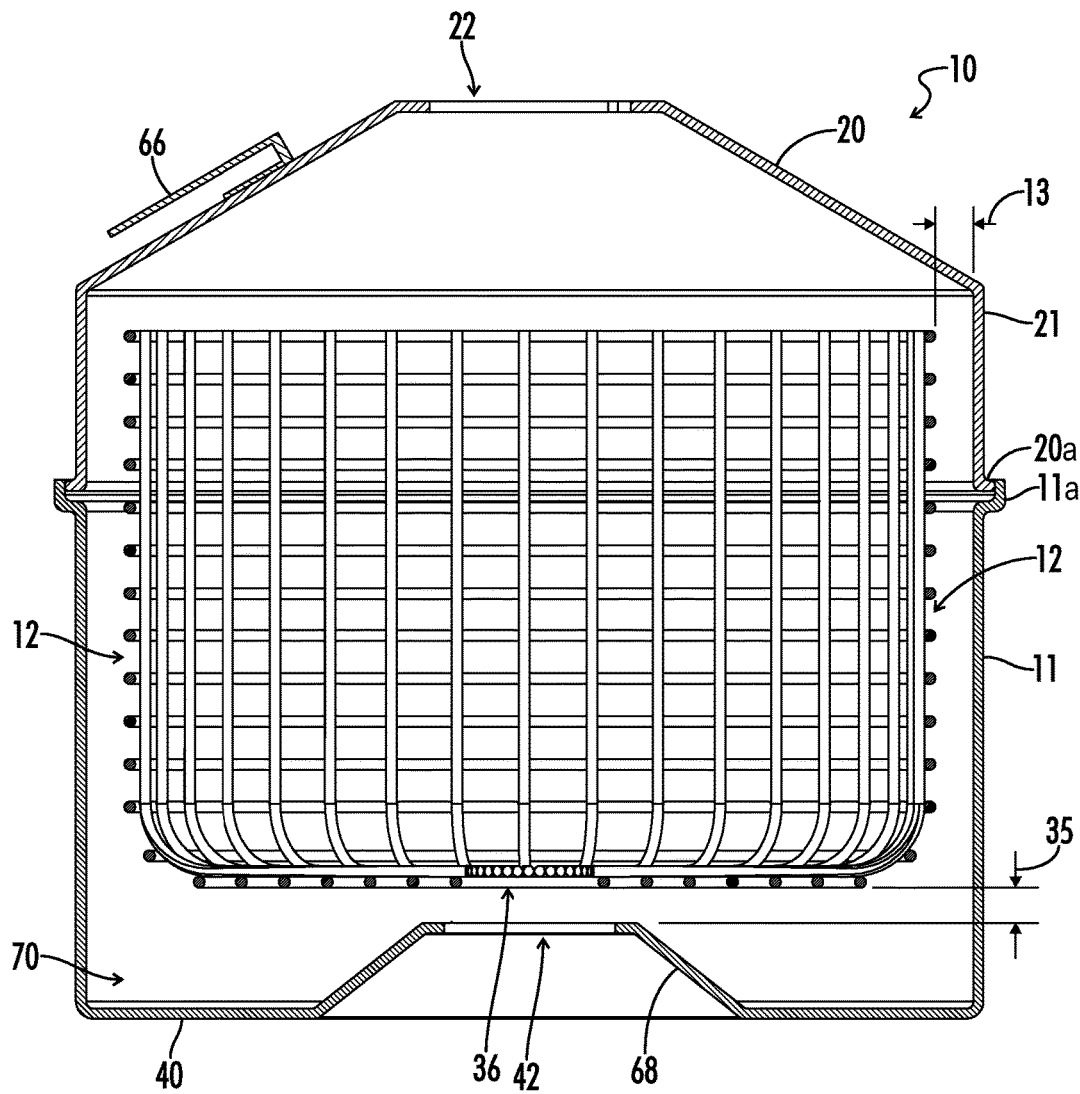
FIG. 15 illustrates a cross-sectional view of an embodiment of a grill smoker apparatus.

Referring further to FIGS. 4 and 14-15, in some embodiments, carrier 14 includes an outer dimension smaller than the inner dimension of container 11 such that a carrier gap 12 is defined between the interior surface of container 11 and the outer dimension of carrier 14. Carrier gap 12 operates as a plenum for allowing passage of air between carrier 14 and the interior walls of container 11. By allowing air to travel upwardly into the carrier gap 12 partially or fully surrounding carrier 14, enhanced air flow into carrier 14 via carrier holes 16 may be achieved. Thus, improved smoke production is possible as described above. Carrier gap 12 defines a carrier gap width 13, seen in FIGS. 8 and 15, defined as the radial distance locally between the outer dimension of carrier 14 and the inner surface wall of container 11. Carrier gap width 13 may be uniform around the perimeter of carrier 14 in some embodiments. In alternative embodiments, carrier gap width 13 may vary along the perimeter of carrier 14.

Referring further to FIG. 2, in some embodiments, container 11 defines a plurality of container legs 26 protruding downwardly from the lower edge of container 11. Each container leg 26 provides a support for container 11. Each container leg 26 may rest against a base 40 or alternatively may be configured to engage a grilling platform directly. A container vent 24 is defined between each adjacent container leg 26. Each container vent 24 allows air to enter into the carrier gap 12 between carrier 14 and container 11. As such, enhanced air flow into the carrier gap 12 and through carrier holes 16 to the smoke producing material housed in carrier 14 may be achieved via container vent 24.

Figure 16:
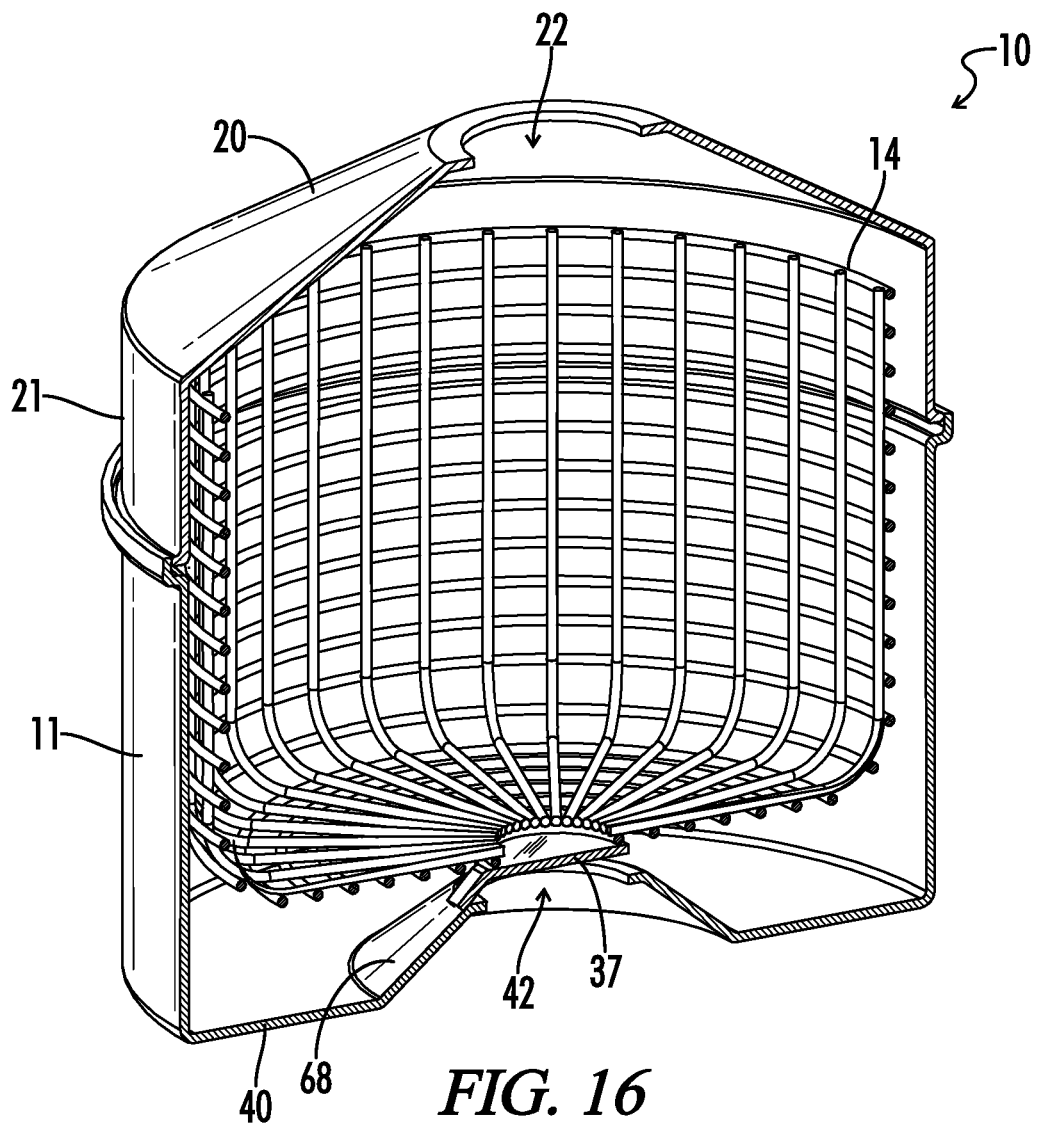
FIG. 16 illustrates a perspective cross-sectional view of an embodiment of a grill smoker apparatus with a carrier having an ash blocker.
Figure 17:
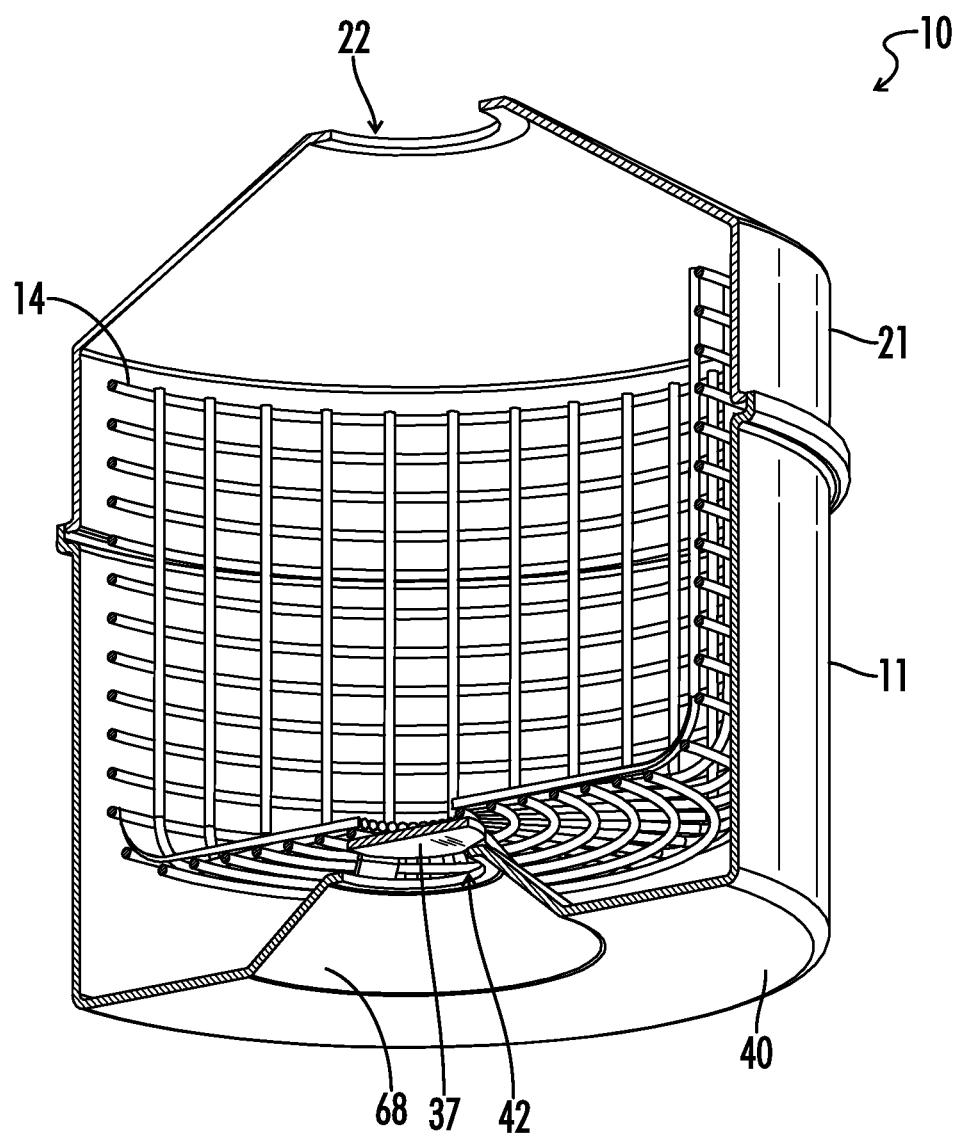
FIG. 17 illustrates a bottom perspective cross-sectional view of an embodiment of a smoker apparatus with a carrier having an ash blocker.

Referring further to FIGS. 3 and 14-15, in some embodiments, a carrier vent 36 is defined at the bottom of carrier 14. Carrier vent 36 includes a hole defined in the bottom of carrier 14. Carrier vent 36 allows the passage of air into carrier 14 from the bottom. In other embodiments, carrier vent 36 may be absent. In such embodiments where carrier vent 36 is absent, the bottom of carrier 14 may include carrier holes 16. Furthermore, the bottom of carrier 14 may include an ash blocker 37 rather than carrier vent 36 so as to completely or partially block the falling of ash or remnants of the smoke producing material onto the heat source, as seen in FIGS. 16 and 17. Additionally, in some embodiments, smoker apparatus 10 is configured to allow ignition of the smoke producing material inside the carrier 14 by a heat source inside the grilling enclosure. As such, heat may be supplied to the smoke producing material into the carrier 14 from below the smoker apparatus 10 via the carrier vent 36. For example, when smoker apparatus 10 is positioned on a grilling surface inside a conventional grilling enclosure, the charcoal or gas burner directly below the smoker apparatus 10 may be used in some embodiments to ignite or heat the smoke producing material stored in carrier 14. Carrier 14 is positioned an offset height 35 above the base vent in some embodiments.

In some applications, it is necessary to provide an open flame to the smoke producing material stored in carrier 14 to ignite or heat the material. As such, it may be necessary to provide a flame upwardly through the carrier vent 36 to ignite or heat the smoke producing material. Conventional grilling devices such as conventional gas grills or charcoal grills may not provide sufficient localized heat to initiate an ignition of the smoke producing material from below. Others have resorted to using lighter fluid and/or an external ignition device such as a grill lighter to initiate combustion of the smoke producing material inside the container.

Figure 5:
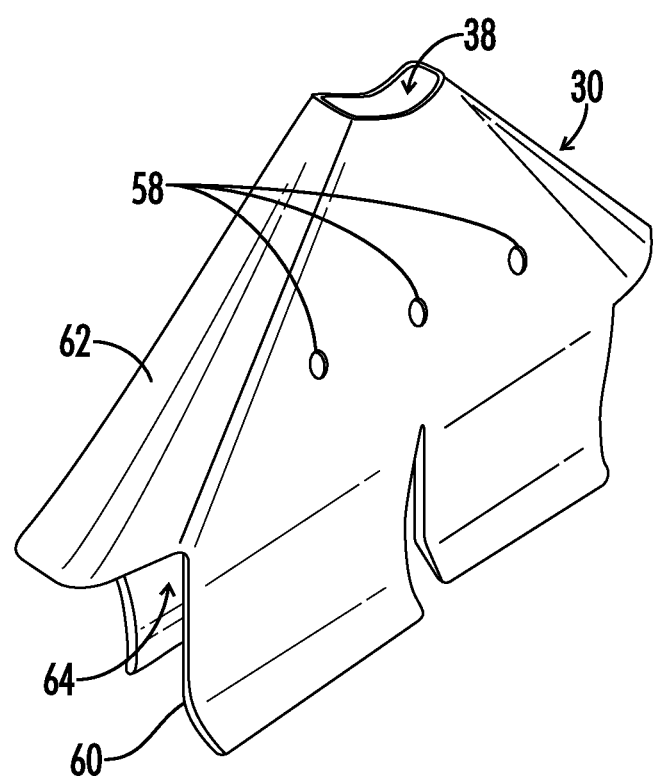
FIG. 5 illustrates a perspective view of an embodiment of a heat concentrator for a grill smoker apparatus in accordance with the present disclosure.

To accommodate direct ignition of the smoke producing material without resorting to external ignition devices, in some embodiments the present disclosure provides an optional heat concentrator 30 as seen in FIGS. 1, 4 and 5 to be positioned directly below the smoker apparatus 10. Heat concentrator 30 is also configured to be installed inside the grilling enclosure and provides localized heat directly below the smoker apparatus 10 to ignite or heat the smoke producing material. Heat concentrator 30 provides a chamber for concentrating heat that rises into heat concentrator 30 from a lower concentrator opening 64, seen in FIG. 5 along lower concentrator end 90. Heat concentrator 30 includes an upper concentrator opening 38 along upper concentrator end 88 having a smaller cross-sectional dimension than the lower concentrator opening 64. In some embodiments, heat concentrator 30 is installed directly onto a gas burner 32, as seen in FIG. 4. Heat concentrator 30 may include one or more concentrator supports 60 resiliently biased inwardly to provide a clamping force against burner 32. In other embodiments, heat concentrator 30 may be suspended from grilling platform 28 rather than supported by gas burner 32. As heated gas or flames move upwardly into the lower concentrator opening 64 and travel toward the upper concentrator opening 38, the heat or flames become compressed and further increase the temperature of the heat or flames. A slightly compressed and heated stream of air and/or flames 39 is emitted from the upper concentrator opening 38 directly into the carrier vent 36. In some embodiments, where a base 40 is disposed between container 11 and the grilling platform, the compressed and heated stream of air and/or flames 39 passes through a base vent 42 defined in base 40. In some embodiments, base vent 42 is concentrically aligned with carrier vent 36 such that the concentrated stream of heat and/or flames may pass directly into carrier 14 unencumbered. In other embodiments not illustrated, the concentrated stream of heat and/or flames may be directed to an ash blocker 37 in the bottom of carrier 14. This stream of concentrated heat and/or flames may be used to ignite or heat the smoke producing material housed in carrier 14. Once the smoke producing material is ignited and the combustion process has begun, the flow of gas to heat concentrator 30 via gas burner 32 may be reduced or eliminated to remove the concentrated heat and/or flames from the smoker apparatus 10.

Heat concentrator 30 in some embodiments includes a plurality of concentrator holes 58 defined in concentrator wall 62 as shown in FIGS. 4 and 5. Each concentrator hole 58 allows air to enter the chamber defined by concentrator wall 62. The increased airflow into heat concentrator 30 allows for a more lean equivalence ration of fuel and air inside the heat concentrator, providing more efficient combustion and allowing higher burn temperatures for igniting the smoke producing material.

Figure 8:
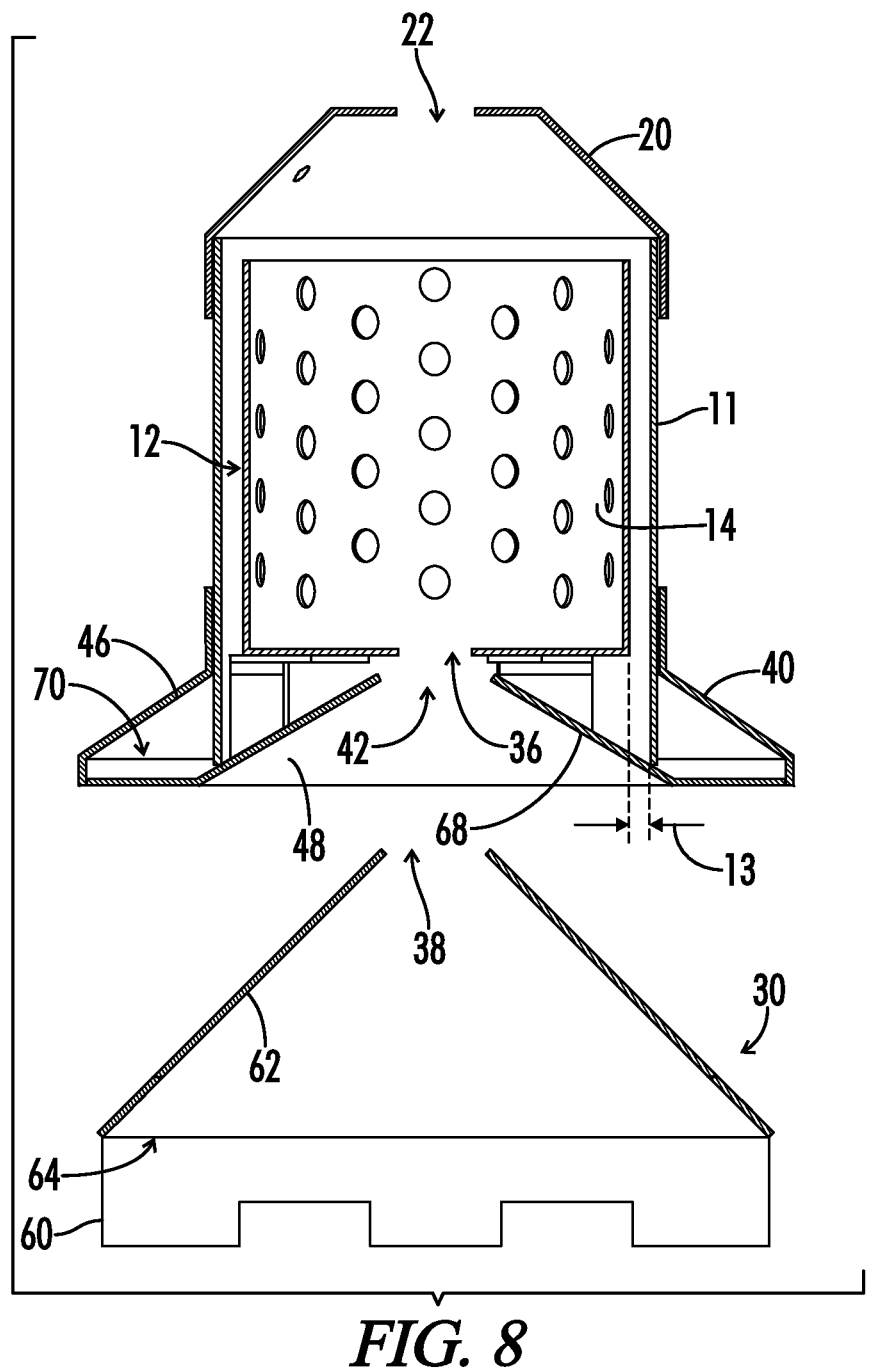
FIG. 8 illustrates a cross-sectional view of an embodiment of a grill smoker apparatus in accordance with the present disclosure.

FIGS. 1, 4 and 8 illustrate embodiments of a smoker apparatus having a heat concentrator 30 positioned below container 11. One embodiment of the heat concentrator 30 includes a chute with a plurality of side walls, as seen in FIG. 5. The opening 38 on the upper end of the chute has no more than one half the area of the opening on the lower end of the chute 64. At the lower end of the chute, adjustable flaps 60 that can be adjusted laterally extend downward. In some embodiments of heat source concentrator 30, adjustable flaps are tension adjustable. In further embodiments, heat concentrator 30 many include an adjustable opening 38 for controlling heat flow.

Figure 6:
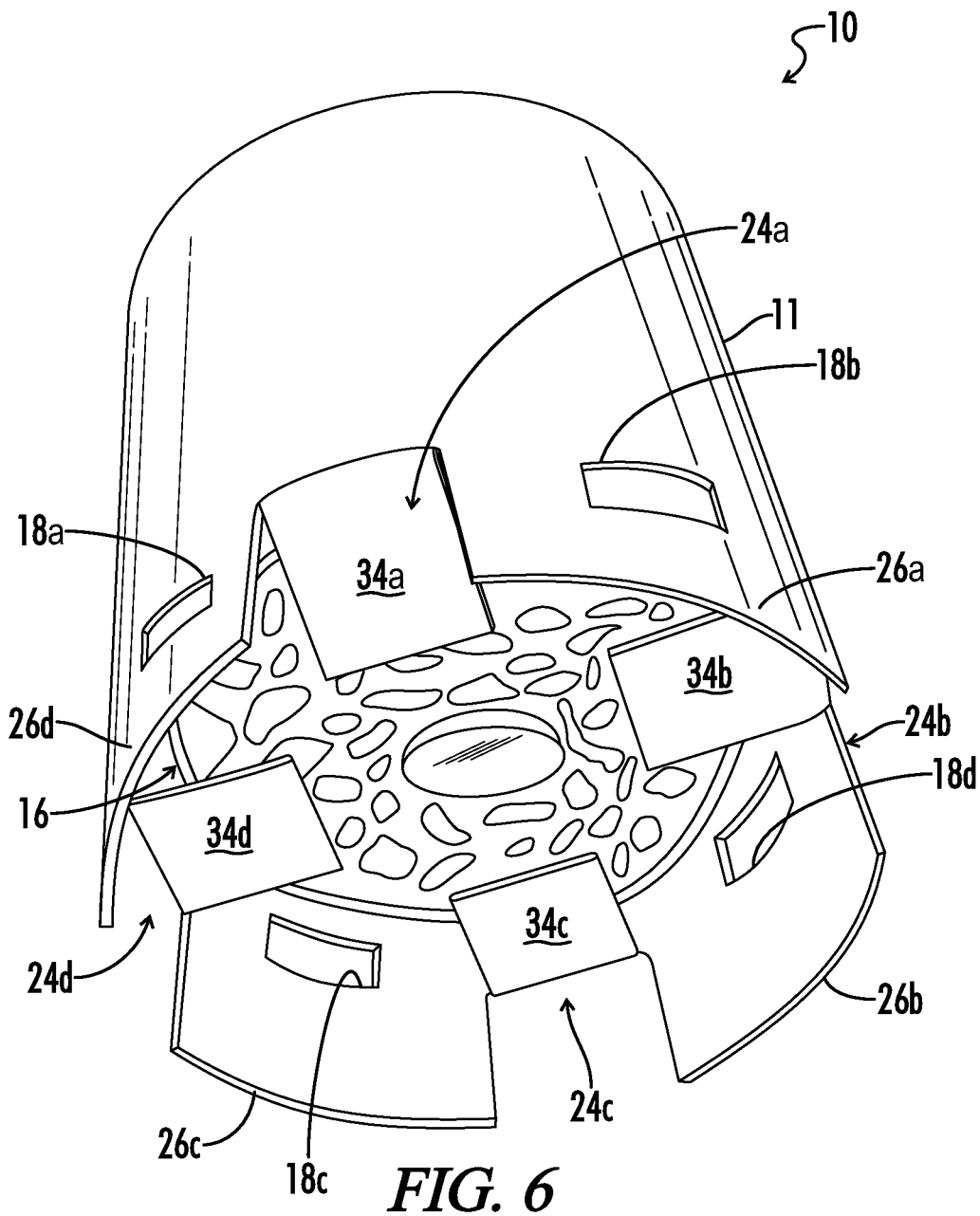
FIG. 6 illustrates a lower perspective view of an embodiment of a grill smoker apparatus in accordance with the present disclosure.

Carrier 14 generally must be retained in container 11 in some embodiments. Referring further to FIG. 6, in some embodiments, a plurality of carrier support tabs 34a, 34b, 34c, 34d may be bent inwardly toward the bottom of carrier 14 from the outer wall of container 11. Each carrier support tab 34 is integrally formed in the wall of container 11. As such, when each carrier support tab 34 is bent inwardly, a corresponding container vent 24 is created at the area where the carrier support tab material was positioned prior to being dislocated. This provides an advantage for manufacturing efficiency in some applications because container vents 24 and carrier support tabs 34 may be formed simultaneously. As seen in FIG. 6, in some embodiments, carrier 14 rests atop the upper surface of the carrier support tabs 34. Alternatively, a variety of different supports or braces may be used to support carrier 14 in addition to or instead of support tabs 34. In alternative embodiments, carrier 14 may be suspended in container 11 via a plurality of hooks that engage the upper perimeter of the container 11. In yet another embodiment, carrier 14 sits directly on the surface upon which the container 11 sits, such as a grilling platform 28 or base 40.

Referring further to FIG. 6, in some embodiments, a plurality of side vents 18a, 18b, 18c, 18d, are defined in the wall of container 11. Each side vent 18 defines a hole through container 11 for providing increased air flow to carrier gap 12. In some embodiments, as seen in FIG. 1, side vents 18 may include an adjustable slide 19 that can be used to alter the cross-sectional opening area of the side vent 18. Slide 19 may be manually positioned to a desired location to allow a desired amount of air to enter through the side vent 18.

In yet another embodiment of a smoker apparatus 10, carrier 14 is situated within the container 11 and connected to the inner walls of the container 11 such that a carrier gap remains between the outer surfaces of carrier 14 and the inner surfaces of the container 11.

Figure 7:
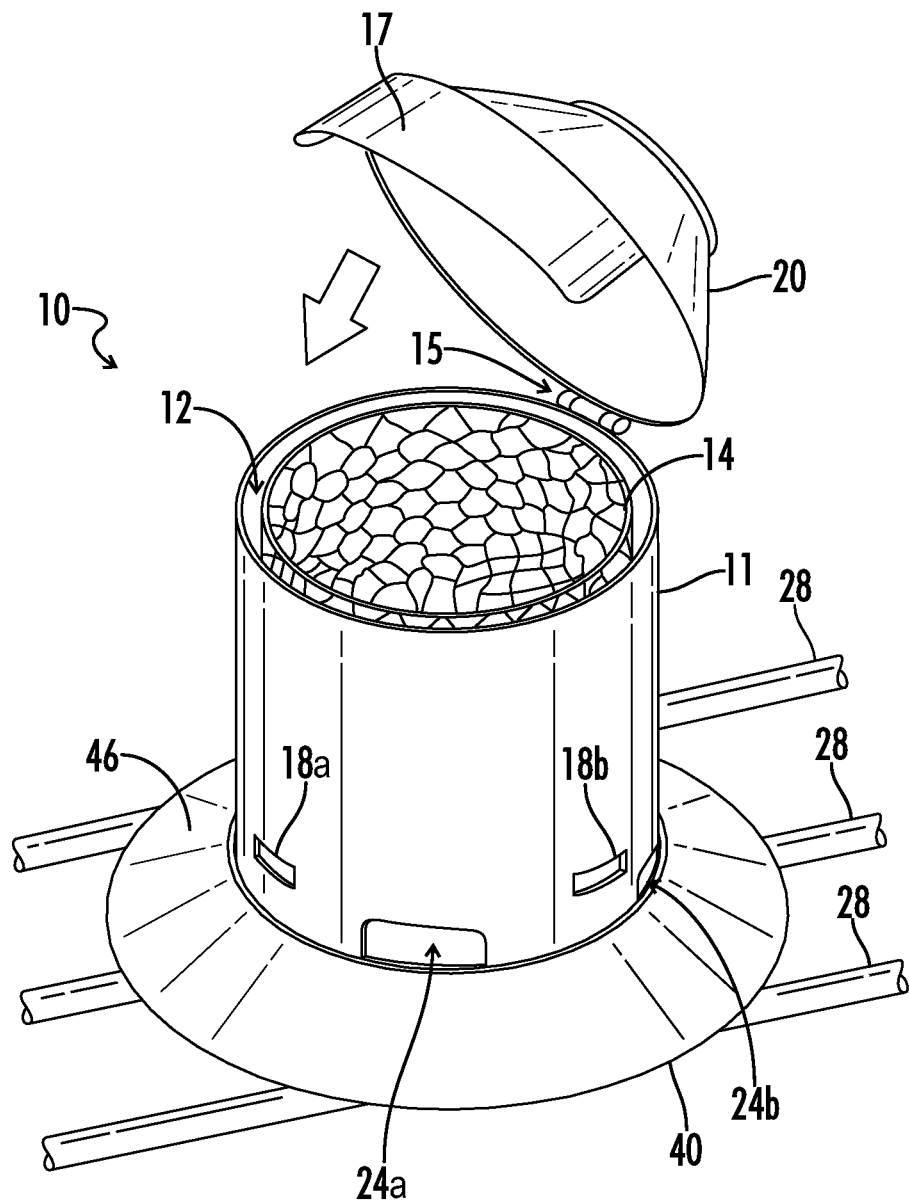
FIG. 7 illustrates a perspective view of an embodiment of a grill smoker apparatus with a hinged cover in accordance with the present disclosure.
Figure 11:
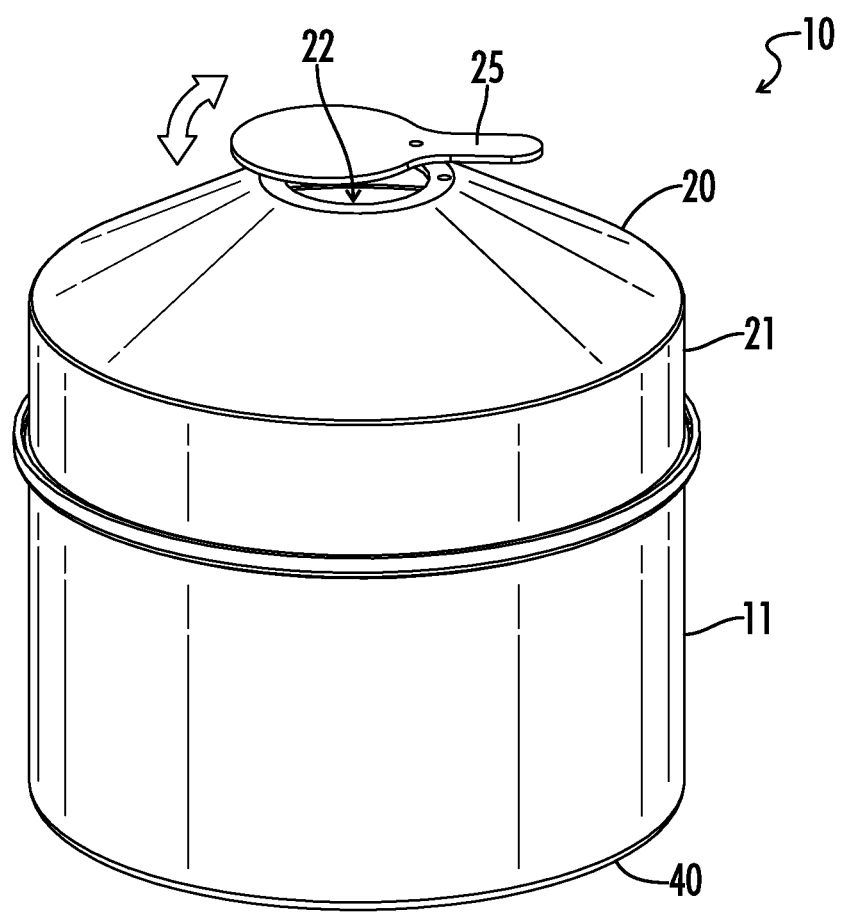
FIG. 11 illustrates a perspective view of an embodiment of a grill smoker apparatus in accordance with the present disclosure.

In various embodiments, smoker apparatus 10 may include different versions of cover 20. Cover 20 encloses the upper end of the container 11 during use. In some embodiments, cover 20 is conically shaped, as seen in FIGS. 3 and 11. Cover 20 may also include the shape of a frustrated cone as seen in FIGS. 1, 7 and 8. Cover 20 also includes a cover side wall 21 extending down from the angled portion of the cover in some embodiments as seen in FIG. 11. Cover 20 may also be completely detachable from container 11, as seen in FIG. 3 in some embodiments. As such, once carrier 14 is installed in container 11, cover 20 is then positioned on the container 11. In alternative embodiments, cover 20 is pivotally attached to container 11 at a cover hinge 15, seen in FIG. 7. Cover 20 maybe pivoted away from container 11 for accessing carrier 14 and pivoted back toward container 11 for closing the top opening of container 11. A cover flange 17 may also be disposed on cover 20 in some embodiments. Cover flange 17 protrudes downwardly from a portion of the lower perimeter of cover 20 in some embodiments. Cover flange 17 may provide a place for a user to engage cover 20 to rotate cover 20 away from container 11. Alternatively, a cover handle 66 is positioned on cover 20 as seen in FIG. 15. A user may use a cooking utensil to engage cover handle 66 and lift cover 20 from container 11. When cover 20 is closed against container 11, it may be difficult to get a utensil into the small gap between the upper edge of container 11 and the lower edge of cover 20. Cover flange 17 protrudes downwardly beyond the intersection of cover 20 and container 11 when cover 20 is in the closed position. A user may use a utensil to engage the lower edge of cover flange 17 along the side of container 11 to manually lift the cover 20 away from container 11.

Referring now to FIGS. 1, 2, 8, and 11, in various embodiments, cover 20 includes one or more cover vents 22 defined in the upper portion of cover 20. Each cover vent 22 allows smoke to be released from smoker apparatus 10 and to allow air flow through the device. In some embodiments, cover vent 22 includes an adjustable opening size using one or more sliding cover vent tabs. Each cover vent tab may be rotated about a pivot point on cover 20 to selectively open or close cover vent 22. When cover vent 22 is fully open, greater air flow may be achieved through smoker apparatus 10, and more smoke may be produced. When cover vent 22 is in a more closed position, air flow may be restricted and less smoke may be produced. By providing an adjustable cover vent 22 in various embodiments, a user may set smoker apparatus 10 to produce just the right amount of smoke for a desired application.

Referring to the optional embodiment in FIG. 1, cover vent 22 is illustrated. In this embodiment, the cover vent opening size is adjustable. A vent cover plate 25 with one or more vent openings is movably attached to the surface of the cover 20 such that the movement of the vent cover plate aligns the vent cover plate opening with all or part of a cover vent 22. In another embodiment of a vent cover plate, as seen in FIG. 11, the vent cover plate is a solid plate connected movably to the cover 20 surface such that the movement of the vent cover plate covers all, part or none of the cover vent 22.

Also seen in FIG. 1, in some embodiments, a handle 66 is disposed on smoker apparatus 10. Handle 66 may be attached to cover 20 in some embodiments. As such, a user may manually engage handle 66 to lift cover 20 from the container 11. Alternatively, handle 66 may be attached to container 11 such that the smoker apparatus 10 as a whole may be moved using handle 66. In other embodiments, container 11 may include handle 66 and cover 20 may include a separate handle 66.

Referring further to FIG. 3, in some embodiments, an integrated cover handle 27 protrudes upwardly from cover 20. Integrated cover handle 27 includes a portion of cover 20 having a substantially uniform diameter such that a user may use a pair of tongs or pliers to grasp integrated cover handle 27 and lift cover 20 from container 11. Integrated cover handle 27 may also include a cover vent 22 defined therein, as seen in FIG. 2, in some embodiments.

Referring further to FIGS. 2 and 4, in some embodiments, container 11 includes a base 40. Base 40 provides an ash collection function in some embodiments. Base 40 forms a bottom to container 11 in some embodiments, as seen in FIGS. 11-17. As the smoke producing material is burned up, ash is produced inside carrier 14. The ash has a tendency to fall downwardly due to gravity. When container 11 is sitting directly atop the grilling platform, ash from carrier 14 may fall directly below the smoker apparatus 10. That ash may circulate inside the grilling enclosure due to natural convection currents and inadvertently land on the food being cooked. This is generally undesirable. To overcome this problem in some embodiments, base 40 includes a plate or dish having a larger outer dimension than container 11. Base 40 also includes an angled base ramp 68, seen in FIGS. 2, 4, 8 and 9. Ash falling from carrier 14 collects on base ramp 68 and slides down base ramp to a collection area 70 on base 40. Collection area 70 may include an outer upturned boundary wall in some embodiments, as seen in FIGS. 2 and 4. Ash falling from carrier 14 thus may be collected on base 40, and when the smoking procedure is complete, the ash may be dumped from the base 40 into an appropriate trash area.

Figure 9:
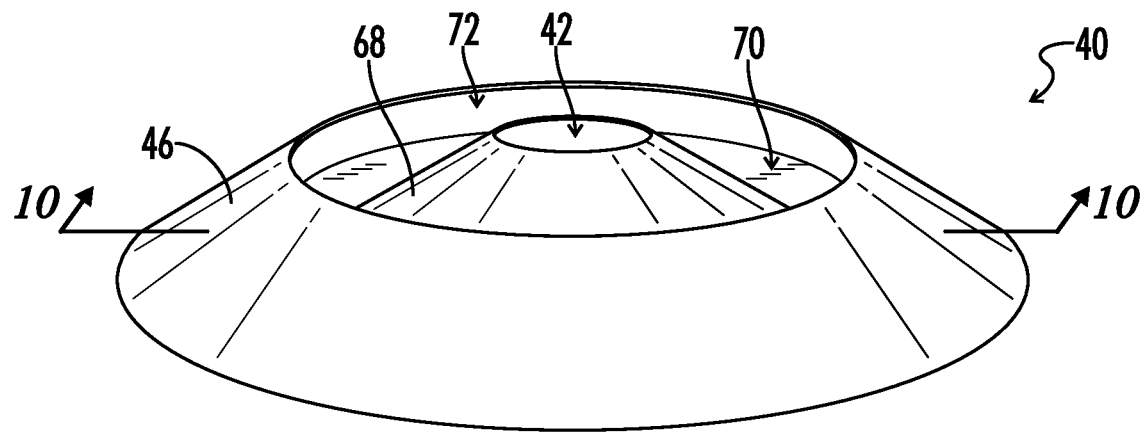
FIG. 9 illustrates an embodiment of a base for a grill smoker apparatus in accordance with the present disclosure.
Figure 10:
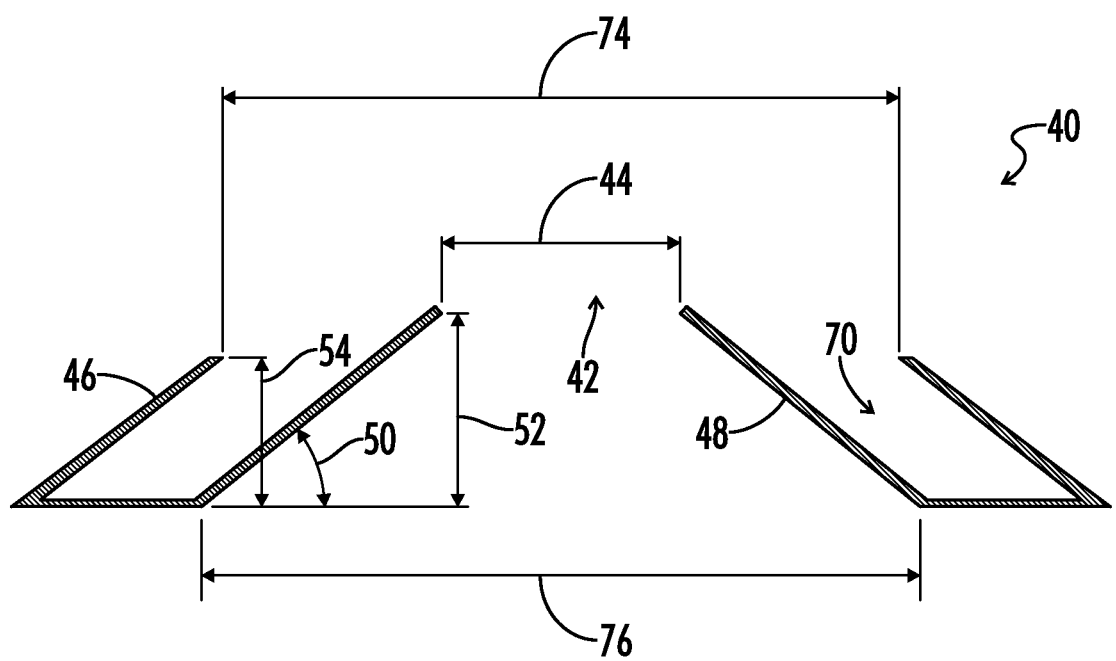
FIG. 10 illustrates a cross-sectional view of Section 10-10 of FIG. 9 in accordance with the present disclosure.

In some embodiments, as seen in FIG. 2 and FIG. 4, ash collected on the base 40 in collection area 70 may be exposed to the air currents inside the grilling enclosure. This may be a problem in some applications if the ash becomes entrained in the internal air currents and ends up making contact with the food items being smoked inside the enclosure. To overcome this problem, in some applications, base 40 is modified to include an outer base wall 46, seen in FIG. 9 and FIGS. 1, 7, 8 and 9. Outer base wall 46 provides a cover for ash deposited in collection area 70. For example, as seen in FIG. 7 and FIG. 9, outer base wall 46 rises upwardly at an angle and forms an outer base wall opening 72, seen in FIG. 9 and FIG. 10. Container 11 is generally dimensioned to fit inside outer base wall opening 72 in some embodiments. As such, outer base wall opening 72 includes an outer base wall opening diameter 74, and container 11 includes an outer diameter. In some embodiments, outer base wall opening diameter 74 is substantially equal to or slightly larger than the container diameter at the lower portion of container 11 inserted into the base 40. This results in a tight fit between the inner upper edge of outer base wall 46 and the outer perimeter of container 11. This tight fit is desirable in many applications to prevent ash material from escaping from collection area 70. In these embodiments, collection area 70 is defined between outer base wall 46 and inner base wall 48, as seen in FIG. 10. It is noted that in some embodiments inner base wall 48 defines an inner base wall height 52, and outer base wall 46 defines an outer base wall height 54. In some embodiments, inner base wall height 52 is greater than outer base wall height 54. As such, the center section of base 40 adjacent base vent 42 protrudes slightly upwardly from the outer base wall opening 72. Additionally, in some embodiments, base vent 42 defines a base vent diameter 44 smaller than outer base wall opening diameter 74.

Figure 12:
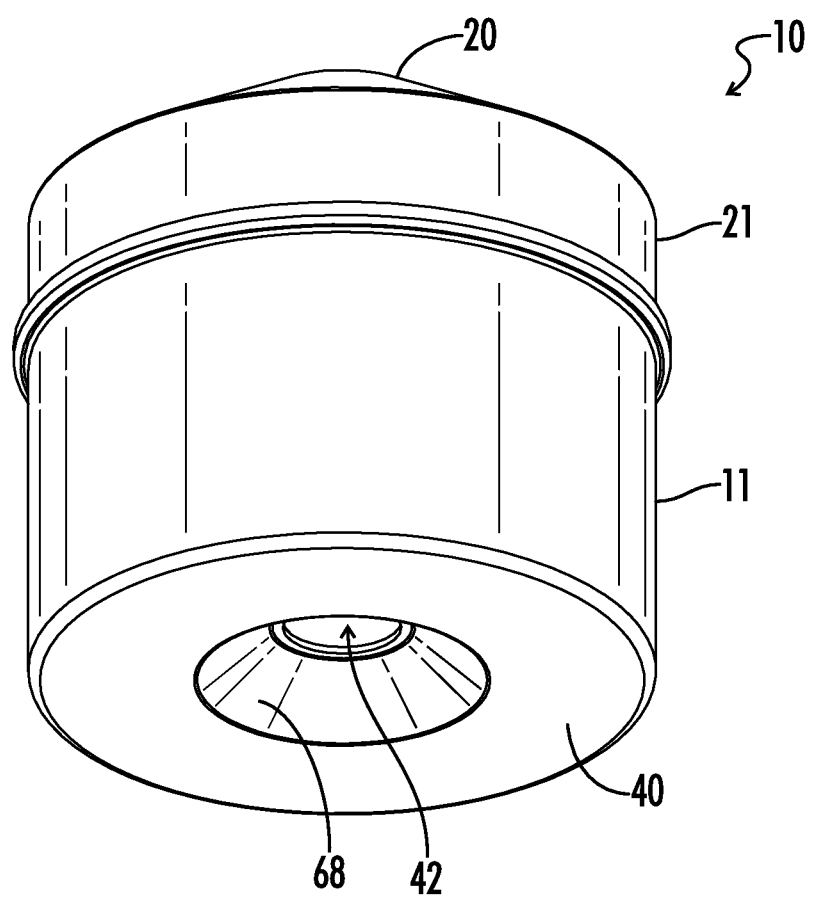
FIG. 12 illustrates a perspective bottom view of the embodiment of a grill smoker apparatus of FIG. 11.

Referring further to FIGS. 9, 10 and 12, in some embodiments, inner base wall 48 forming base ramp 68 includes a lower surface having the shape of an inverted funnel. The lower side of base ramp 68 formed by inner base wall 48 being angled upwardly at a lower base wall angle 50 provides an additional concentration of heat rising upwardly from the bottom of base 40. As heat rises upwardly toward the underside of base ramp 68, the heat is concentrated toward base vent 42. This provides an additional advantage over conventional smokers for increasing the heat applied to the smoke producing material directly above base vent 42 in some embodiments.

Figure 13:
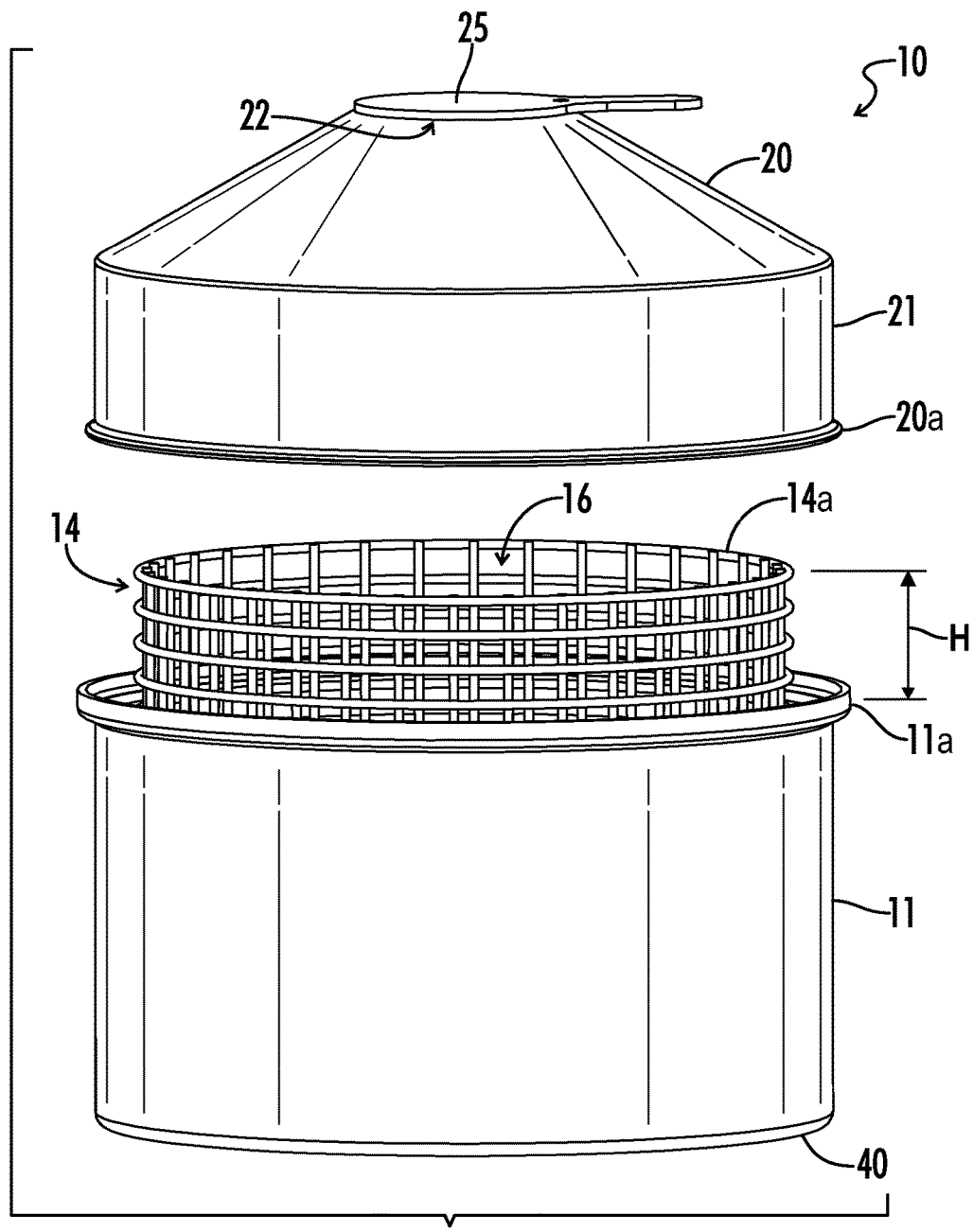
FIG. 13 illustrates a partially exploded view of an embodiment of a grill smoker apparatus with a cover removed from the container.

As seen in FIG. 13, in some embodiments, carrier 14 includes a height above base 40 greater than the height of container 11 above 40, forming an offset height H of carrier 14 greater than container 11. As such, carrier 14 includes a portion that extends above the upper edge 11a of container 11. When cover 20 is placed on container 11, an engagement is formed between the lower edge 20a of cover side wall 21 and the upper edge 11a of container 11. It is advantageous in some applications to have the intersection of cover and container at a position lower on the device to distance the intersection from the cover vent 22 to reduce the likelihood of smoke escaping from the intersection instead of the cover vent 22.

Different material compositions may be used to form the various structural features of smoker apparatus 10 or heat concentrator 30. In some embodiments, ASTM A424 Type 1 steel is used as the heat resistant material for some or all of the various components of the smoker apparatus 10 and/or heat concentrator 30. Other possible heat resistant materials could include stainless steel or porcelain enamel coated metals.

Figure 18:
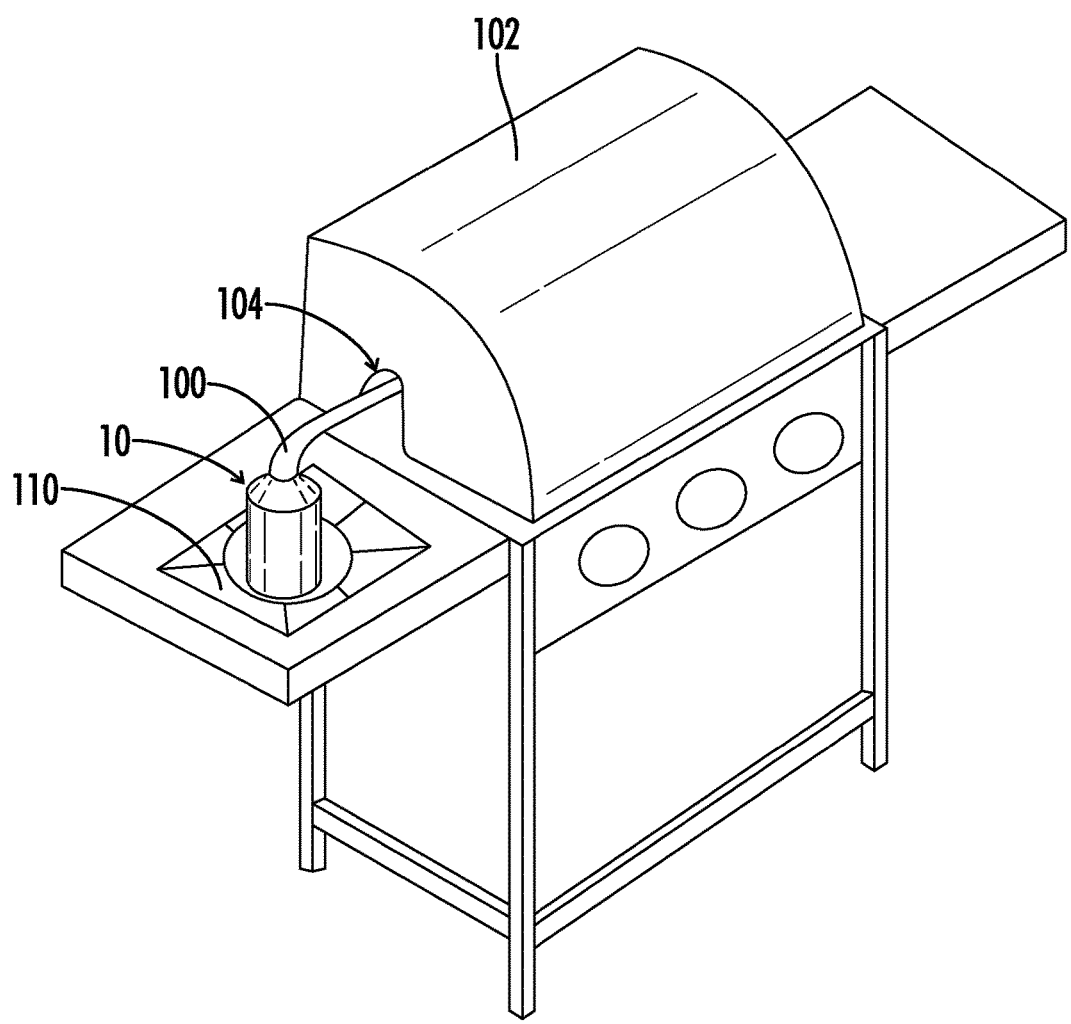
FIG. 18 illustrates a perspective view of a grill with a grill smoker apparatus positioned on a side burner outside the grill enclosure.

Referring further to FIG. 18, in some embodiments, smoker apparatus 10 is configured to be used on side burner 110 outside of a grill enclosure 102. Smoker apparatus 10 includes a vent extension 100 coupled to cover vent 20. The vent extension 100 is shaped to extend from the smoker apparatus 10 to an enclosure opening 104 in the grill enclosure 102. The vent extension 100 can include a hollow tube or conduit in some embodiments. Vent extension 100 can include a flexible or rigid pipe in some embodiments.

Figure 19:
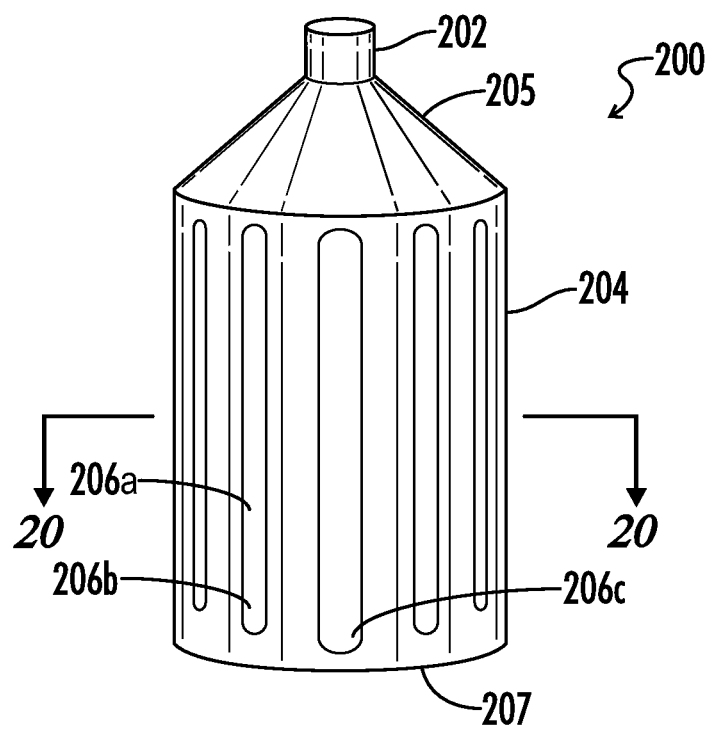
FIG. 19 illustrates a perspective view of an alternative embodiment of a grill smoker apparatus.
Figure 20:
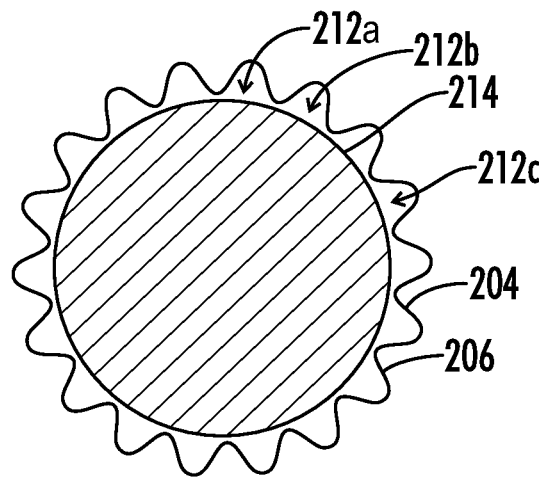
FIG. 20 illustrates a partial cross-sectional view of Section 20-20 of FIG. 19.

Referring further to FIGS. 19-20, an integrated grill smoker apparatus 200 in some embodiments includes a container body 204 with a cover 205 and a base 207. The container, cover and base can be formed in a disposable arrangement such as a three-piece can arrangement in some embodiments. A removable cap 202 is located on cover 205 over the cover vent. The removable cap 202 may be unscrewed and removed by a user to open the cover vent. The removable cap 202 may include a plastic cap threaded onto the cover in some embodiments. The container 204 is pre-filled with smoke producing materials such as wood chips or pellets in some applications. A seal or other removable cap is located on base 207 covering the base vent. A user may remove the removable cap covering the base vent prior to use to allow air to enter the base vent. Additionally, one or more grooves or ridges 206a, 206b, 206c may be formed in the container body. Each groove or ridge provides a contoured profile to the container body in a corrugated arrangement. Each groove 206 defines a local air channel 212a, 212b, 212c, etc. on the interior of the container 204, as seen in FIG. 20. Each air channel provides a passage for air to travel upwardly through the container and engage the smoke producing material 214 housed in the container.

Furthermore, sizes of various structural parts and materials used to make the above mentioned components are illustrative and exemplary only, and persons of ordinary skill in the art would recognize that these sizes and materials can be changed as necessary to produce different results or different desired characteristics or capabilities. It should be understood that the smoker apparatus 10 and/or heat concentrator 30 are not limited to the examples disclosed in the specification.

Thus, although there have been described particular embodiments of a new and useful grill smoker apparatus and heat concentrator it is not intended that such references be construed as limitations upon the scope of the present invention except as set forth in the following Claims.

What is claimed is:

1. A smoker apparatus for placement inside a grilling enclosure, comprising:
    a container;
    a cover disposed on the container, the cover including a cover vent operable to emit smoke from the cover;
    a fuel carrier disposed in the container and enclosed between the container and the cover, the fuel carrier having a fuel carrier bottom and a fuel carrier side wall extending upward from the fuel carrier bottom, the fuel carrier side wall including a plurality of fuel carrier holes for allowing air passage into the fuel carrier; and
    a carrier gap defined between the container and the fuel carrier side wall, the carrier gap configured to allow air to flow between the container and the fuel carrier side wall;
    wherein the container is dimensioned to be positioned inside the grilling enclosure, wherein the fuel carrier comprises a wire mesh basket, wherein the cover is removable from the container, wherein a base at the lower end of the container, wherein a base ramp on the base, the base ramp inclined inwardly toward the fuel carrier, wherein the base ramp has the shape of an inverted funnel, wherein a base vent defined in the base ramp, the base vent open to the interior of the container, the base vent positioned to allow air to enter the container through the base vent, wherein a carrier vent defined in the carrier opposite the base vent, wherein an ash blocker positioned between the fuel carrier and the base vent, wherein a cover vent defined in the cover, the cover vent including a moveable vent cover plate, wherein a heat concentrator positioned below the container including one or more side walls of a heat resistant material and having an upper concentrator end and a lower concentrator end; an upper concentrator opening defined at the upper end; a lower concentrator opening defined at the lower end, the lower concentrator opening having an opening area at least two times the opening area of the upper concentrator opening and a concentrator support extending from the lower end of one of the side walls configured to directly engages a heat source and support the heat concentrator orienting the upper end toward the container.

2. The apparatus of claim 1, further comprising the fuel carrier side wall having an outer perimeter, and the carrier gap forming a continuous annular gap around the outer perimeter of the fuel carrier side wall.

3. The apparatus of claim 1, wherein the fuel carrier is removable from the container.

4. The apparatus of claim 1, wherein the cover is pivotally attached to the container at a hinge.

5. A smoker apparatus for generating smoke when placed inside a grilling enclosure, comprising:
    a container having a base, the base including a base vent defined in the base;
    a cover disposed on the container, the cover including a cover vent defined in the cover, wherein the smoke is emitted from the cover vent;
    a fuel carrier positioned inside the container between the container and the cover, the fuel carrier including a plurality of fuel carrier holes for allowing air passage into the fuel carrier, the base vent positioned beneath the fuel carrier, the fuel carrier including a carrier bottom and a carrier side wall extending upwardly from the carrier bottom;
    the carrier side wall having an outer dimension, and the container having an inner dimension, wherein the outer dimension of the carrier side wall is less than the inner dimension of the container; and an air gap defined in the container between the carrier side wall and the container, wherein air flows into the base vent, into the air gap, into the carrier, and out the cover vent when smoke is generated inside the cooking enclosure;

wherein the container is dimensioned to be positioned inside the grilling enclosure, wherein the carrier bottom is vertically offset above the base vent, and a gap is defined between the base vent and the carrier bottom, wherein the container having a container height above the base, and the fuel carrier having a fuel carrier height above the base, wherein the fuel carrier height is greater than the container height.

6. The apparatus of claim 5, wherein the plurality of fuel carrier holes are located in the carrier side wall and the carrier bottom.

7. A smoker apparatus for placement inside a grilling enclosure, comprising:

a container having an interior and a base and a container wall rising upwardly from the base;

a base ramp defined on the base, the base ramp including an angled region forming the shape of an inverted funnel, the base ramp angled in a direction toward the interior of the container;

a base vent defined in the base ramp positioned to allow passage of air into the container through the base vent;

a cover disposed on the container, the cover including a cover vent positioned to emit smoke directly into the grilling enclosure;

a fuel carrier in the form of a mesh container disposed in the container, the fuel carrier having a fuel carrier bottom and a fuel carrier side wall extending upward from the fuel carrier bottom, the fuel carrier side wall including a plurality of fuel carrier holes for allowing air passage into the fuel carrier;

a carrier gap defined between the container and the fuel carrier side wall, the carrier gap configured to allow air to flow between the container the fuel carrier side wall, the carrier gap forming a continuous annular gap around the outer perimeter of the fuel carrier;

wherein the container is dimensioned to be positioned inside the grilling enclosure, wherein an ash blocker positioned between the base vent and the fuel carrier, wherein the fuel carrier rests against the ash blocker, wherein the ash blocker is positioned facing the base vent, wherein the ash blocker is attached to the base ramp, wherein the fuel carrier is vertically offset above the base vent, wherein the fuel carrier includes a height above the base when the fuel carrier is installed in the container, and the container includes a container height, wherein the fuel carrier height above the base is greater than the height of the container.

* * * * *